United States Patent
Hilton

(10) Patent No.: US 11,525,059 B2
(45) Date of Patent: Dec. 13, 2022

(54) INTUMESCENT COATING COMPOSITIONS EFFECTIVE AT LOW TEMPERATURES

(71) Applicant: SWIMC, LLC, Cleveland, OH (US)

(72) Inventor: Sharon L. Hilton, Bolton (GB)

(73) Assignee: SWIMC, LLC, Cleveland, OH (US)

( * ) Notice: Subject to any disclaimer, the term of this patent is extended or adjusted under 35 U.S.C. 154(b) by 476 days.

(21) Appl. No.: 16/653,031

(22) Filed: Oct. 15, 2019

(65) Prior Publication Data
US 2021/0108092 A1   Apr. 15, 2021

(51) Int. Cl.
C09D 5/18 (2006.01)
C09D 7/65 (2018.01)
C09D 135/02 (2006.01)
C09D 163/00 (2006.01)

(52) U.S. Cl.
CPC ............... C09D 5/185 (2013.01); C09D 7/65 (2018.01); C09D 135/02 (2013.01); C09D 163/00 (2013.01)

(58) Field of Classification Search
CPC ...... C08L 63/00–10; C09D 163/00–10; C09D 5/185; C09D 7/65
See application file for complete search history.

(56) References Cited

U.S. PATENT DOCUMENTS

| 5,070,119 | A | 12/1991 | Nugent, Jr. et al. |
| 5,332,785 | A * | 7/1994 | Brindoepke ....... C08G 59/4042 |
| | | | 528/110 |
| 5,968,669 | A | 10/1999 | Liu et al. |
| 6,084,008 | A | 7/2000 | Liu |
| 6,207,085 | B1 | 3/2001 | Ackerman |
| 6,740,359 | B2 * | 5/2004 | Kumar ................... C08G 59/50 |
| | | | 528/121 |
| 9,528,035 | B2 | 12/2016 | Campbell |
| 2011/0130518 | A1 * | 6/2011 | Gorodisher ............. C08L 63/00 |
| | | | 525/119 |
| 2011/0237711 | A1 | 9/2011 | Herman et al. |
| 2014/0303283 | A1 * | 10/2014 | Ding .................... C09D 133/00 |
| | | | 523/436 |
| 2015/0159368 | A1 | 6/2015 | Green et al. |
| 2016/0145446 | A1 | 5/2016 | Kittle et al. |
| 2016/0145466 | A1 | 5/2016 | Spilman et al. |
| 2016/0152841 | A1 | 6/2016 | Butler et al. |

(Continued)

FOREIGN PATENT DOCUMENTS

| EP | 477840 | 4/1992 |
| EP | 2061126 | 5/2009 |
| WO | 2001005886 | 1/2001 |

(Continued)

OTHER PUBLICATIONS

International Search Report and Written Opinion related to PCT/US2019/056233, dated Jun. 2, 2020, 74 pages.

(Continued)

*Primary Examiner* — Kregg T Brooks
(74) *Attorney, Agent, or Firm* — McDonald Hopkins LLC

(57) ABSTRACT

An intumescent composition capable of withstanding temperature cycling as low as −60° C. without cracking is contemplated. The composition also exhibits enhanced durability due to its resistance to water absorption, its acceptable cure times, and (when exposed to fire conditions) its well-adhered, foamed char layer.

30 Claims, 4 Drawing Sheets

(56) References Cited

U.S. PATENT DOCUMENTS

2016/0160059 A1   6/2016   Anderson et al.
2018/0079915 A1   3/2018   Peskens et al.

FOREIGN PATENT DOCUMENTS

| WO | 2010131037 | 11/2010 |
| WO | 2011160832 | 12/2011 |
| WO | 2018227458 | 12/2018 |

OTHER PUBLICATIONS

International Search Report and Written Opinion for Patent Application No. PCT/US2019/056082 dated Jan. 2, 2020; 10 pages.
Weil, Edward W. "Fire-Protective and Flame-Retardant Coatings—A State-of-the-Art Review", Sep. 1, 2010, 38 pages; Polymer Research Institute, Polytechnic Institute of New York University, Six MetroTech Center, Brooklyn, New York 11201, USA.

* cited by examiner

INTUMESCENT COATING COMPOSITIONS EFFECTIVE AT LOW TEMPERATURES

TECHNICAL FIELD

The present invention relates generally to intumescent compositions and, more specifically, to intumescent coatings which can retain their structural integrity even when repeatedly exposed to environmental temperatures approaching −60° C.

BACKGROUND

In the last fifty years, flame-retardant materials have become increasingly important, particularly with respect to the manufacture of consumer goods, construction materials, and other commonly used and/or mass-produced articles. Insofar as many flame-retardant materials incorporate specialized chemical compounds, it is often useful to coat the flame-retardant(s) onto a substrate rather constructing the article entirely from the flame-retardant material itself.

Flame-retardants applied to a substrate function in any combination of ways to protect the substrate. Some materials will endothermically degrade upon exposure to flames or high temperature, thereby removing heat energy from the substrate. Additionally or alternatively, flame-retardants can act as a thermal barrier to transfer heat energy away from the substrate. As a final mechanism, some materials release compounds upon exposure to heat (e.g., inert or non-combustible gases) so as to dilute the combustible reactants. Generally speaking, rather than actively suppress flames, the purpose behind these mechanisms is to slow the rate of temperature increase (i.e., the reaction rate contributing heat), thereby prolonging the amount of time the substrate can withstand the fire/flame condition.

Intumescent coatings are a form of passive fire protection, usually applied as a thin film, that swell many times their original thickness forming an insulation char. This acts as a barrier between the fire and substrate (such as structural steel). Intumescent coatings are often categorized according to the type of fire they are designed to provide protection against, for example, cellulosic fueled or hydrocarbon fueled fires.

Intumescent coatings are particularly utilized for application on steel and other metal structural components (e.g., beams, sheets, columns etc). For example, these coatings can be employed on structural steel to prevent collapse and/or structural compromise of bulk-heads, decks, and firewalls of buildings as a further protection for occupants during a fire event.

Conventional intumescent coatings may contain a resin system "pigmented" with various intumescent ingredients that under the influence of heat, react together to produce an insulating foam or "char." Preferably, this char will have low thermal conductivity but a volume that is many times that of the original coating, thereby greatly reducing the rate of heating experienced by the substrate and extending the time before the steel loses its integrity and the building/structure collapses.

In particular, when conventional intumescent coatings are exposed to fire or excessive heat, an acid forms and reacts with a char-forming agent (carbon source) to create char. Simultaneously, a blowing agent degrades to produce a non-flammable gas, thereby driving expansion of the char as a foam. The resulting thick, porous, highly-insulating, non-flammable, solid foam protects the substrate it covers from incident heat. Thus, the coating should produce a tough, hard, strong, and compact char foam which is robust enough to resist the extreme erosive forces of the certain fires, while still maintaining sufficient adhesion to the substrate (structural steel in this case).

Cellulosic fueled fires are typical of modern day commercial and infrastructure projects in the Built Environment, usually for architectural applications internally and externally exposed structural steelwork. The cellulosic standard fire test curve (BS 476-20 Cellulosic) reaches 500° C. within about 3 minutes and rises to in excess of 1000° C. (i.e., 1832° F.) over 90 minutes.

Hydrocarbon fueled fires are typical of oil and gas installations. The hydrocarbon standard fire test curve (BS476-20 Hydrocarbon) reaches 500° C. within 1 minute and rises to in excess of 1000° C. (i.e., 1832° F.) in about 8 minutes.

Hydrocarbon fueled jet fires are highly erosive, extremely turbulent fires (ISO 22899-1), and have an immediate heat rise to 1100° C. Fires of this nature experience heat fluxes in the order of 250 Kw/m$^2$.

During any type of fire, the rate of heating depending on the specific dimensions of the steel sections used in the structure. The rate of heating is dependent on the Hp/A value of the section, Where Hp is the perimeter of the steel When viewed in cross-section, and A is the cross-sectional area. A steel section with a large perimeter (Hp) will receive more heat than one with a smaller perimeter. On the other hand, the greater the cross-sectional area (A), the more heat the steel section can absorb. Thus, a large thin steel section having a high Hp/A value will heat up more quickly than a small thick section having a lower Hp/A value.

Adhesion of unburned coating composition is extremely important prior to a fire in order to ensure the intumescent functions properly. Cracking brought about by cyclic climatic exposure (i.e., via regular heating and cooling cycles, as will occur both on a day-to-day basis and, in many regions, on a season-by-season basis, as well as more extreme or dramatic drops brought on by unusual weather events) is problematic.

In view of the foregoing, there is a need for a curable intumescent composition which is capable of adhering to a steel substrate without cracking in the unburned state, even when exposed to extreme changes in temperature and weather conditions. In addition, the coating composition needs to be capable of intumescing to form a uniform carbonaceous char upon exposure to heat or flame thereby protecting the underlying steel substrate from structural damage which may be brought about by a fire.

At present, Jotachar JF750 from Jotun (Sandefjord, Norway) is one type of commercially available intumescent epoxy coating. Chartek 7 by Akzo Nobel (Amsterdam, the Netherlands) and Firetex M90/02 by Sherwin Williams (Cleveland, Ohio) are other examples of intumescent coatings. Additional intumescent and/or flame-retardant products may be sold under these or other tradenames by each of these respective entities or other entities.

United States Patent Publication 2016/0145466 discloses intumescent coatings that are suitable for protecting substrates against hydrocarbon fires, such as jet fires. The compositions include thermosetting polymer(s), curing agent(s), phosphoric and/or sulphonic acid, metal or metalloid ions, and an amine functional blowing agent. As such, the intumescent coating can be used without a supporting mesh.

United States Patent Publication 2016/0152841 contemplates similar types of intumescent coatings. Here, boric acid may be used in addition to the phosphoric/sulphonic acid(s), and melamine and isocyanurate are also included. Metal or metalloid ions are not required.

United States Patent Publication 2016/0145446 describes a further iteration in comparison to the above referenced documents. In this instance, the intumescent comprises thermosetting polymer(s), curing agent(s), phosphoric and/or sulphonic acid, metal or metalloid ions, and urea-, dicynamide-, and/or melamine-based blowing agent(s).

United States Patent Publication 2016/0160059 provides an intumescent coating based upon an organic polymer, a spumific, and an additive providing a combination of two different sources of metal/metalloid ions. Hydroxy-functional polysiloxanes are claimed in this particular use, and specific types of metal atoms are recited.

In still a further example, United States Patent Publication 2015/0159368 describes a liquid intumescent coating with at least one ethylenically unsaturated monomeric polymer resin. The resin is cured by free radical polymerization adhesively bound onto a reinforcement structure, such as inorganic fabric.

In contrast, examples of coating compositions specifically engineered for cold-weather conditions are also known. For example, U.S. Pat. No. 5,070,119, European Patent EP0477840B1, United States Patent Publication 2018/0079915 and International Patent Publications WO2010131037A1 and WO2018227458A1 all provide examples of such materials. Silicone-based alternative coatings are also sold under the trade names SILOTHERM from Elox-Prom (Moscow, Russia) and NULLFIRE from Tremco-Illbruck Ltd. (London, England).

SUMMARY OF INVENTION

An intumescent coating composition is able to repeatedly withstand extremely low temperatures (i.e., −60° C.) without cracking while retaining sufficient durability (as demonstrated by resistance to water absorption), acceptable cure times, shore D hardness, and an expandable, well-adhered, foamed char layer. In one aspect, the coating composition balances the flexibility of an epoxy resin and curing agent combination by incorporating an internally flexibilised acetoacetoxy polyacetoacetate (AcAc) terminal unit in a polymer, such as an AcAc functional epoxy polyester block copolymer or an AcAc functional dimer fatty acid/polyester block copolymer. In another embodiment, a synergistic balance of specific epoxy resin binders and amine functional curing agents—with or without catalytic accelerators—also achieves these goals. In further aspect, a resin system relies upon either of these same principles/approaches.

The compositions and coatings produced by these compositions have particular utility in providing intumescent protections. Thus, the cured coating should be at least 20 mm, capable of curing at 23° C. to a Shore D hardness of least 5.0 in less than 24 hours, at least 25 in less than 7 days, and at least 35 in less than 14 days. The water (deionized, natural, or salt water) absorption for the cured coating is at least less than 10.00 wt. % and, more preferably, less than 5.0 wt. % after 28 days of submersion and at least less than 3.00 wt. % and, more preferably, less than 1.00 wt. % after 5 days of submersion (with all wt. % relative to the dry weight of the coating before submersion). Further still, the cured coating can withstand temperatures of −55° C. or less (even as low as −67.5° C.) without cracking, and this durability applies for at least 5 and, more preferably, at least 12 complete temperature cycles from its lowest point back up to ambient conditions. Test procedures and further quantitative and qualitative details are provided in the description and examples below, all of which specifically inform and augment aspects of this disclosure.

One aspect of the invention encompasses a flexible resin system appropriate for use with epoxy intumescent coating compositions. This resin system may include any combination of the following features (in addition to all of the other details disclosed within this description):

at least one epoxy resin and an acetoacetate polyacetoacetate (AcAc) functional polymer combined with an amine functional curing agent to form a coating that cures within 24 hours with a shore D hardness of at least 2.5 or that cures within 24 hours at 23° C. with a shore D hardness of at least 5.0;

a catalyst selected from: dipropylenetriamine, benzyldimethylamine, n,n-dimethylpropylamine, bis(dimethylaminoethyl)ether, bis-n,n-dimethylethanolaminether, 1,3-propanediamine, 1,3-bis[3-(dimethylamino)propyl]urea, N'-(3-(dimethylamino)propyl)-N,N-dimethyl, 1,4-diazabicyclooctane (DABCO), 2-(2-(2-dimethylaminoethoxy)-ethylmethylamino)-ethanol, 1,8-diazabicyclo[5.4.0]undec-7-en (DBU), 1,3-propanediamine, N'-(3-(dimethylamino)propyl)-N,N-dimethyl 1,5-diazabicyclo[4.3.0]non-5-en, 1,1,3,3-tetramethylguanidine, N,N,N'N",N"-pentamethyldiethylentriamine, triphenylphosphine, trioctylphosphine, nonylphenol, 2-ethyl-4-methylimidazole, 2,6-dimethylpyridine, N,N-bis-(2-hydroxyethyl)-3-methylaniline, dimethylphenylphosphine, methyldiphenylphosphine, triphenylphosphite, N,N,N', N",N"-pentamethyl, dimethylaminopyridine, N-(3-dimethylaminopropyl)-N,N-diisopropanolamine, styrenated phenols, Tris-(dimethylaminomethyl)phenol, and amino-n-propyldiethanolamine N,N,N',N",N"-pentamethyl-dipropylenetriamine.

wherein the AcAc functional polymer includes at least one terminal AcAc unit as follows.

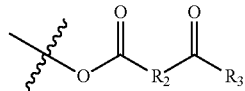

in which $R_2$ is —$CH_2$— and $R_3$ is —$CH_3$;

wherein the cured coating: (i) when equilibrated to −60° C., does not crack after a manual bend test, and (ii) when immersed in water for at least 5 days, gains less than 7.5 or less than 5.0 wt. % (relative to a dry weight of the film prior to being immersed);

wherein the AcAc functional polymer is at least one selected from: an polyester block copolymer, a dimer fatty acid/polyester block copolymer, and an adduct, modification, or derivative thereof, wherein the at least one epoxy resin is selected from: bisphenol A diglycidyl ether epoxide resin; bisphenol F diglycidyl ether epoxide resin; epoxidized polyurethane, oxymethylene bisoxirane resin; epoxidized alkyl phenols, epoxidized polyglycol diglycidyl ether, bis- and oxirane bisphenol A diglycidyl ether resins; epoxidized dimer acid; oleic acid; linoleic acid; erucic acid; epoxidized trimer fatty acid; ethoxylated or propoxylated methacrylate monomers; bisphenol A, F, and A/F epoxy, epoxy phenolic, novolac resins; epoxy cresol novolac resin; epoxidized castor oil triglycidyl ether; epoxidized phenyleneoxy[1-(butoxymethyl) ethylene, di-functional glycidyl ether; C13, C15-alkyl glycidyl ether; poly tetramethylene ether glycol; polypropylene glycol copolymers; and any combination of two or more thereof, wherein the amine functional curing agent is selected from: polyamine, polyamide, polyamidoamine, polyamidoimidazoline, aliphatic amine, phenalkamine, polyetheramine modified phenalkamine, dimer-diamine mixtures comprising C36 Dimeric diamine, C18 amine, and C54 Trimeric amine, cycloaliphatic polyamine, polyetherpolyamine, alkyletheramine, polyethylenimine, fatty alcohol adducted polyetheramine, polyetherurethanamine, polyether-urethanepolyamine, polyurethaneamine, polyetheramine, polyetheramide, polypropyleneamide, polypropyleneamine, polyamide made by reacting with dimer fatty acids, phenalkamide, polyamidoimidazoline, polyetherpolyamides, polyaminoamide, any combination of two or thereof, and adducts or modifications thereof, wherein the at least one epoxy resin is selected from: (a) a bisphenol A/epichlorohydrin derived epoxy resin (b) a multifunctional resin containing both epoxide groups and reactive unsaturation (c) an internally flexibilised bisphenol A/epichlorohydrin derived epoxy resin (d) a polyacetoacetate epoxy polyester (e) dimer fatty acid polyester block copolymer (f) polyurethane epoxy resin or (g) a cashew nut based and Castor Oil triglycidyl ether epoxy resin or can be a combination thereof, wherein the epoxy resin or resins account for between 10.00 and 70.00 wt. % of a total mass of the coating, the amine functional curing agent or agents account for between 5.00 and 60.00 wt. % of the total mass of the coating, and the AcAc functional polymer accounts for between 0.50 and 30.00 wt. % of the total mass of the resin system;

wherein the AcAc functional polymer is provided as part of the epoxy resin so that the epoxy resin includes the at least one terminal AcAc unit; and wherein the acetoacetate polyacetoacetate functional polymer has any of the structural features shown in FIGS. 1A through 1D.

A separate aspect of the invention specifically contemplates intumescent coating composition resistant to cracking at −60° C. and water absorption. It includes any combination of the following features (in addition to all of the other details disclosed within this description):

a first part comprising at least one epoxy resin, an acetoacetoxy polyacetoacetate (AcAc) functional polymer, and an optional liquid plasticizer;

a second part comprising at least one amine functional curing agent including polyamide having an H eq.wt. between 90 and 110, and an optional liquid plasticizer;

an intumescent ingredient package including an acid source, a carbon source, and a gas source;

wherein the AcAc functional polymer includes a terminal AcAc unit as follows

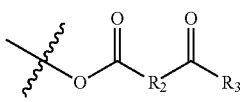

in which $R_2$ is —$CH_2$— and $R_3$ is —$CH_3$;

wherein the intumescent ingredient package further comprises at least one of: a nucleating agent, fibres, a plasticiser, rheology modifiers, wetting/dispersion additives, and any combination thereof;

wherein every chain in the AcAc functional polymer ends with the terminal AcAc unit;

wherein the AcAc functional polymer consists of at least 0.50 wt. % relative to a combined mass of the composition and, more preferably, about 5.00 to about 25.00 wt. % relative to the combined mass of the composition;

wherein the at least one amine functional curing agent consist of at least 5.00 wt. % relative to a combined mass of the composition and, more preferably, about 15.00 to about 30.00 wt. % relative to the combined mass of the composition;

wherein the at least one epoxy resin consists of at least 10.00 wt. % relative to a combined mass of the composition and, more preferably, about 15.00 to about 25.00 wt. % relative to the combined mass of the composition;

wherein the at least one epoxy resin is derived from bisphenol A;

wherein the amine functional curing agent includes polytetramethylene ether glycol-based polyether amines having an H eq wt between 500 and 770;

wherein the acetoacetate polyacetoacetate functional polymer has any of the structural features shown in FIGS. 1A through 1D;

wherein the AcAc functional polymer is integrated with the epoxy resin so that the epoxy resin includes the at least one terminal AcAc unit; and wherein the cured coating has a thickness of at least 20 mm, at least 22 mm, or at least 24 mm.

DESCRIPTION OF THE DRAWINGS

Operation of the invention may be better understood by reference to the detailed description taken in connection with the following illustrations. These appended drawings form part of this specification, and any information on/in the drawings is both literally encompassed (i.e., the actual stated values) and relatively encompassed (e.g., ratios for respective dimensions of parts). In the same manner, the relative positioning and relationship of the components as shown in these drawings, as well as their function, shape, dimensions, and appearance, may all further inform certain aspects of the invention as if fully rewritten herein. Unless otherwise stated, all dimensions in the drawings are with reference to inches, and any printed information on/in the drawings form part of this written disclosure.

In the drawings and attachments, all of which are incorporated as part of this disclosure.

DETAILED DESCRIPTION

Figure 1A:
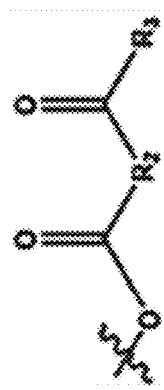
FIGS. 1A through 1D depict the chemical structure of various chemical structures useful as acetoacetoxy polyacetoacetate (AcAc) components in certain embodiments.

Specific reference is made to the appended claims, drawings, and description, all of which disclose elements of the invention. While specific embodiments are identified, it will be understood that elements from one described aspect may be combined with those from a separately identified aspect. In the same manner, a person of ordinary skill will have the requisite understanding of common processes, components, and methods, and this description is intended to encompass and disclose such common aspects even if they are not expressly identified herein.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

Temperatures as low as −60° C. are experienced in many parts of the world where there is a requirement for hydrocarbon fire and/or jet fire protection. Temperature fluctuations are also frequently experienced leading to cracking problems, among other things.

Prior art epoxy intumescent coatings designed for hydrocarbon fire and jet fire applications (e.g., PITT-CHAR XP sold by PPG Industries, Inc. in Pittsburgh, Pa. and/or those described in International Patent Publication WO/2018/227458, as well as the patent documents identified above), sometimes claim unique flexibility but this is generally at 'ambient temperature' and usually for thinner coatings (i.e., ≤15 mm for less than 1.5 hours of protection) than those needed to deliver jet fire protection (i.e., 20 to 28 mm for at least 2 hours of protection). In any case, no claim is made of crack resistance below −40° C. In addition, no claim is made as to low water absorption. Indeed, many technologies in the art have significant water absorption, which is detrimental to the coating.

Further, prior art technologies that claim offer low temperature usually experience high water absorption. In turn, cure rates for water-absorbing coatings may become unacceptably protracted, and other problems associated with water absorption in intumescent coatings will be familiar to those in this field.

In particular, it was understood that, for flexibility at extremely low temperatures (i.e., less than −40° C. and approaching −60° C.), it was preferable to select a resin with comparatively low glass transition (Tg), such as an epoxy resin binder with an amine functional curing agent. However, these systems can also be slow to cure and may not be durable as they can tend to absorb high levels of water. It was understood that adding a catalyst may speed up the cure speed but the coating could become more brittle and not able to withstand temperatures below −30° C. while also leading to increased water adsorption. Such amine catalysts as like Tris-(dimethylaminomethyl)phenol, Benzyldimethylamine (BDMA), Amino-n-propyldiethanolamine, Triethanolamine, N,N-dimethyldipropylenetriamine, Tris-(dimethylaminomethyl)phenol, have increased effect on water adsorption and detrimental effects on coating low temperature flexibility.

The inventors determined that many urethane epoxy resin binder and/or polyetherurethanamine or polyetherurethane amine functional curing agents were sufficiently flexible and did not crack at temperatures down to −60° C. However, the water adsorption for these systems was unacceptably high and their cure speed slow—leading to a coating with a tacky surface that was not suitable.

The present invention relies upon a unique balance between the both epoxy resin binders, amine functional curing agents with or without catalyst. Such formulations are directed to intumescent coatings designed for hydrocarbon fueled and jet fire protection in such cold weather environments (i.e., where −60° C. is regularly or occasionally observed). This invention addresses the issue of both low temperature flexibility and water uptake by presenting a low water absorption version and a cure rate close to conventional materials (when curing conditions are at −23° C. at 50° % humidity).

The compositions contemplated herein are typically epoxy/polyamide based systems that form a robust and hard char when exposed to a hydrocarbon or jet fire. This hard char is designed to withstand the extreme erosive forces of these fires. The coating can swell typically up to 20 times its dry film thickness and insulates (protects) the steel from heat by slowing the rate of heating.

To achieve the specified fire resistance period the intumescent coating can typically be applied at up to 30 mm dry film thickness. This presents challenges when the material is exposed in situ to extreme low temperatures. When sub-zero temperatures reach around −20° C. to −40° C., traditional epoxy intumescent coatings will typically crack especially when temperature variation from cold to warm is experienced cyclically.

The present invention overcomes this problem and allows for an epoxy based coating formulation that when installed on steel at 20 mm and even up to 28 mm, without a reinforcing mesh, can withstand temperatures down to −60° C. without visually cracking. Moreover it can withstand continuous temperature cycles from +20° C. to −60° C. without visually cracking.

Still other characterizing features of the coatings produced by the compositions herein relate to hardness, adhesion, and expansive char formation. These properties can be measured by applicable standardized tests (such as various regimes published by ASTM International), with shore D hardness being particularly pertinent. The test methods set forth in the Examples below, including the qualitative and/or quantitative metrics for pass or fail, provide means for characterizing and distinguishing various aspects of the invention.

The present invention is directed to epoxy intumescent coatings. Generally epoxy based paints offer unrivalled corrosion protection and water resistance which is highly desirable in heavy industrial and ocean and marine environments. In this present invention the intumescent coating would be used for 'on-shore' or 'off-shore' applications.

Epoxy resin binders are obtained in a known manner, for example from the oxidation of the corresponding olefins or from the reaction of epichlorohydrin with the corresponding polyols, polyphenols or amines. Basic information on and examples for epoxide resins can be inferred from the section "Epoxy resins" of the Encyclopedia of Polymer Sciences and Technology, Vol. 9, Wiley-Interscience, 2004. Reaction products of polyhydroxy compounds can be mentioned by way of example as suitable epoxide resins, in particular polyvalent phenols or phenol-aldehyde condensates with epihalohydrins or the precursors thereof, in particular: (a) reaction products of epichlorohydrin with bisphenol A; (b) reaction products of epichlorohydrin with bisphenol F; (c) aromatic glycidyl amine resins; phenyleneoxy[I-(butoxymethyl) ethylene: (d) epoxy novolacs on phenol such as alkyl phenols or cresol basis; (e) epoxide resins without aromatic structural units; as well as mixtures of two or more epoxide resins of this type in any ratio and in any degrees of purity.

Here, the epoxy resin binder may be produced by any suitable method. The epoxy resin binder may comprise one or more epoxy resins. Such 'epoxy resins' may include (homo) polymers and copolymers derived from combinations of compounds comprising at least one epoxide functionality such as glycidol with cyclic co-reactants, suitably aromatic co-reactants comprising at least two hydroxyl groups such as Bisphenol A, alkyl phenolics. As used herein, the terms "epoxy" and "epoxide" are used interchangeably. Examples of suitable compounds comprising at least one epoxide functionality include, but are not limited to one or more of the following: epichlorohydrin, fatty acids, glycidol, glycol amines or mixtures thereof. Examples of suitable cyclic co-reactants, suitably aromatic co-reactants include, but are not limited to one or more of the following: BisphenolA; Bisphenol F; Epoxidized Polyurethane, Epoxidized phenyleneoxy[I-(butoxymethyl)ethylene, poly tetramethylene ether glycol, polyethylene oxide, polypropylene glycol copolymer.alkyl phenolics, Novolac resins such as alkyl phenol novolac, phenolic novolac and cresol novolac or mixtures thereof. As well as mixtures of two or more of epoxy resin binders of any type in any ratio and in any degrees of purity.

Suitable epoxy resin binders (i.e., epoxy functional resin) can derived from or include (a) polyglycidyl ethers derived from such polyhydric alcohols such as ethyleneglycol, diethyleneglycol, triethyleneglycol, 1,2-propyleneglycol, 1,4-butyleneglycol, 1,5-pentanediol, 1,2,6-hexanetriol, glycerol, thrimethylolpropane, bisphenol-A (a condensation product of acetone and phenol), bisphenol-F (a condensation product of phenol and formaldehyde), hydrogenated bisphenol-A, or hydrogenated bisphenol-F, (b) polyglycidyl ethers of polycarboxylic acids, formed by the reaction of an epoxy compound such as epichlorohydrin with an aromatic or aliphatic polycarboxylic acid such as oxalic acid, succinic acid, glutaric acid, terephthalic acid, 2,6-napthalene dicarboxylic acid, or dimerised linoleic acid, fatty acids, adipic acid; oleic acid, linoleic acid, erucic acid and the like: decanedioic acid or dimer, or Trimer fatty acids and a like with polyglycol diglycidyl ethers thereof. (c) epoxy resins containing oxyalkylene groups, (d) epoxidized phenyleneoxy[I-(butoxymethyl) ethylene, (e) Epoxidized olefinically unsaturated alicyclic materials such as epoxy alicyclic ethers and esters, (f) Epoxy resins containing or reacted with either poly tetramethylene ether glycol and/or polypropylene glycol including mixture thereof (g) Epoxy novolac resins, which are prepared by reacting an epihalohydrin (e.g. epichlorohydrin) with the condensation product of an aldehyde with a monohydric or polyhydric phenol (e.g. phenolformaldehyde condensate)(h) Epoxidized Polyurethane or Polyetherurethane (i) Amine-terminated polyether adducted. Epoxidized phenyleneoxy[I-(butoxymethyl)ethylene, (j) any combination of two or more of the foregoing in any appropriate ratio and in any degrees of purity.

Polyepoxide liquid resins are particularly suitable as epoxy resin binders, they are commonly termed "liquid epoxy resin". These have a glass transition temperature which is usually below 25° C., In this present invention the suitable compounds are the glycidylization products of dihydroxybenzene derivatives such as resorcinol, hydroquinone and pyrocatechol; further bisphenols or polyphenols such as bis-(4-hydroxy-3-methylphenyl)-methane, 2,2-bis-(4-hydroxy-3-methylyphenyl)-propane (bisphenol-C), bis-(3,5-dimethyl-4-hydroxyphenyl)-methane, 2,2-bis-(3,5-dimethyl-4-hydroxyphenyl)-propane, 2,2-bis-(4-hydroxyphenyl)-butane (bisphenol-B), 3,3-bis-(4-hydroxyphenyl)-pentane, 3,4-bis-(4-hydroxyphenyl)-hexane, 4,4-bis-(4-hydroxyphenyl)-heptane, 2,4-bis-(4-hydroxyphenyl)-2-methylbutane, polyoxyethylene, 2,4-bis-(3, 5-dimethyl-4-hydroxyphenyl)-2-methylbutane, 1,1-bis-(4-hydroxyphenyl)-cyclohexane (bisphenol-Z), 1 1,1-bis-(4-hydroxyphenyl)-3,3,5-trimethylcyclohexane (bisphenol-TMC), 1,1-bis-(4-hydroxyphenyl)-1-phenyl-ethane, 1,4-bis [2-(4-hydroxyphenyl)-2-propyl]-benzol) (bisphenol-P), 1,3-bis-[2-(4-hydroxyphenyl)-2-propyl]benzol) (bisphenol-M), 4,4'-dihydroxydiphenyl, 4,4'-dihydroxybenzophenon, bis-(2-hydroxynaphth-1-yl)-methane, bis-(4-hydroxynaphth-1-yl)-methane 1,5-dihydroxy-naphthalin, tris-(4-hydroxyphenyl)-methane, 1,1,2,2-tetrakis-(4-hydroxyphenyl)-ethane bis-(4-hydroxyphenyl)-ether, polyglycidyl ether, bis-(4-hydroxyphenyl)sulfate; condensation products of phenols with formaldehyde which are obtained under acidic conditions, such as phenol novolacs or cresol novolacs, also called bisphenol F novolacs; aromatic amines, such as aniline, toluidine, 4-aminophenol, 4,4'-methylendiphenyldiamine (MDA), 4,4'-methylendiphenyldi-(N-methyl)-amine, 4,4'-[1,4-phenylene-bis-(1-methylethylidene)]-bisaniline (bisaniline-P), [1,3-phenylene-bis-(1-methylethylidene)]-bisaniline (bisaniline-M); as well as mixtures of two or more of any type in any ratio and in any degrees of purity.

The epoxy resin used in the practice of this invention may include one or more epoxy resins employed in combination. In general, the epoxy resins can be derived from glycidated resins, cycloaliphhatic resins, epoxidized oils, fatty acids, polyhydric alcohols and so forth. The glycidated resins are frequently the reaction product of a glycidyl ether, such as epichlorohydrin, and a bisphenol compound such as bisphenol A. C4-C28 alkyl glycidyl ethers; C2-C28 alkyl- and alkenyl-glycidyl esters; C1-C28 alkyl-, mono- and polyphenol glycidyl ethers; polypropyleneglycol diglycidyl ether, C13, C15-alkyl glycidyl ether, polypropylene glycol triglycidyl ether, glycerol propoxylate triglycidyl ether, bis- and oxirane Bisphenol A diglycidyl ether, di-functional glycidyl ether, polyglycidyl ethers of pyrocatechol, resorcinol, hydroquinone, 4,4'-dihydroxydiphenyl methane (or bisphenol F), 4,4'-dihydroxy-3,3'-dimethyldiphenyl methane, 4,4'-dihydroxydiphenyl dimethyl methane (or bisphenol A), 4,4'-dihydroxydiphenyl methyl methane, 4,4'-(1-methylethylidene) phenol diglycidyl ether, 4,4'-dihydroxydiphenyl cyclohexane, 4,4'-dihydroxy-3,3'-dimethyldiphenyl propane, 4,4'-dihydroxydiphenyl suflone, and tris (4-hydroxyphynyl)methane; polyglycidyl ethers of the chlorination and bromination products of the above-mentioned diphenols; polyglycidyl ethers of novolacs; polyglycidyl ethers of diphenols obtained by esterifying ethers of diphenols obtained by esterifying salts of an aromatic hydrocarboxylic acid with a dihaloalkane or dihalogen dialkyl ether; polyglycidyl ethers of polyphenols obtained by condensing phenols and long-chain halogen paraffins containing at least two halogen atoms; N,N'-diglycidyl-aniline; N,N'-dimethyl-N,N'-diglycidyl-4,4'-diaminodiphenyl methane; N,N,N',N'-tetraglycidyl-4,4'-diaminodiphenyl methane; N,N'-diglycidyl-4-aminophenyl glycidyl ether; N,N,N',N'-tetraglycidyl-1,3-propylene bis-4-aminobenzoate, phenol novolac epoxy resin binder; cresol novolac epoxy resin; and combinations thereof in any ratio.

More specifically, the epoxy resin binder may comprise commercially available epoxy resin materials. In certain embodiments, the epoxide resin binder may comprise Bisphenol diglycidyl ether epoxide resins, such as Bisphenol A diglycidyl ether and/or Bisphenol F diglycidyl ether epoxide resins. In a further embodiment, the epoxide resin binder may comprise one or more of the following: Bisphenol A diglycidyl ether epoxide resin; Bisphenol F diglycidyl ether epoxide resin; epoxidized polyurethane, oxymethylene bisoxirane based resin, epoxidized alkyl phenols, epoxidized polyglycol diglycidyl ether, bis- and oxirane Bisphenol A diglycidyl ether, epoxidized dimer acid such as but not limited to oleic acid, linoleic acid, erucic acid and the like, epoxidized trimer fatty acid, acrylate and alkyne monomers (unsaturated acrylate, carbon-carbon double or triple bonds) including methacrylate monomers which can be ethoxylated or propoxylated. Bisphenol A or F and A/F epoxy, epoxy phenolic, novolac resin, epoxy cresol novolac resin. Including but not limited to epoxidized; castor oil triglycidyl ether, epoxidized phenyleneoxy[I-(butoxymethyl) ethylene, di-functional glycidyl ether, C13, C15-alkyl glycidyl ether, poly tetramethylene ether glycol, polypropylene glycol copolymer, as well as mixtures of two or more of epoxide resins of this type in any ratio and in any degrees of purity.

Preferably, the aforementioned epoxies include a bisphenol diglycidyl ether epoxide resin along with an AcAc functional polymer comprising an internally flexibilised acetoacetoxy polyacetoacetate (acetoacetyl-functional groups) functional epoxy polyester block copolymer and/or an acetoacetate functional dimer fatty acid based polyol/polyester block copolymer.

The acetoacetyl-functional polymers or copolymers may include one or more of the acetoacetyl-functional groups. A generalized example of an acetoacetyl-functional group structure is shown in FIG. 1A, which has the formula $C_4H_5O_3$, where R2 is a $CH_2$, R3 is a methyl group, and ester group is provided pendant to the main chain. The acetoacetyl can provided with the epoxy functional resin. While all of these components may be initially combined, relatively limited pot times may necessitate the use of a two-part system and/or with the AcAc-functional polymer used as a separate additive (relative to the epoxy resin(s) and the amine curing agent) so as to maximize the ability to effectively coat substrates as desired. The acetoacetyl-functional groups can be internal, terminal, branched or side chained or mixtures of, although at least one branch of the polymer preferably terminates with acetoacetyl-functionality. The acetoacetyl-functional group may be bonded to the polyester functional block or directly to the polyol functional block as needed for a particular application.

Derivative of these acetoacetate copolymers are also viable, including but not limited to (a) polypropylene glycol based (e.g., co-reacted with polypropylene glycol), poly-diol based (e.g., co-reacted with a polycarbonate diol, polypropylene glycol, polyether diol, polyester diol, etc), (b) urethane modified (e.g., co-reacted with isocyanate) iterations thereof (c) silicones, silanes, (meth) acrylates, acrylics, but not limited to. Such (Acetoacetate) based epoxy resin binder(s) can be used on its own or mixed with any other epoxy resin binders listed in this invention in any ratio or purity.

A generalized formula for the AcAc functional polymer is shown below and in FIG. 1A, where $R_2$ is —$CH_2$— and $R_3$ is —$CH_3$. This structure is positioned on at least one terminal end of a straight or branched chain, with that structure linked to the remaining polymer chain by way of an ester linkage. In some embodiments, this ester linkage may be part of the polymeric repeating unit. Broadly speaking throughout this disclosure, any reference to AcAc functional polymers encompasses this structure on at least one end of the polymer chain. In certain embodiments, the AcAc functional polymer may take the form of an acetoacetate functional dimer fatty acid based polyol and/or polyester block copolymer, as elsewhere herein. As used in this disclosure, AcAc polymers may be characterized as terminating in either or both of these structures, provided such structure is appended to the terminal end of at least one branch or chain of the polymer (thereby rendering the polymer an AcAc functional polymer).

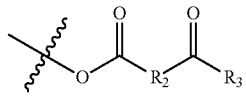

One particular type of AcAc functional polymer can be based on reactions with polyols, and the structure below provides an example. Here, the structure is shown below and in FIG. 1B, with n being a whole integer between 5 and 75 and, more preferably, at least 8 and no greater than 68. Note that an AcAc unit, as shown in FIG. 1A, is positioned at a terminal end of the chain.

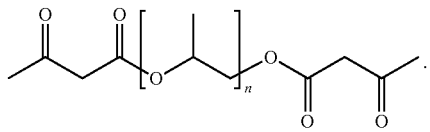

Figure 1C:
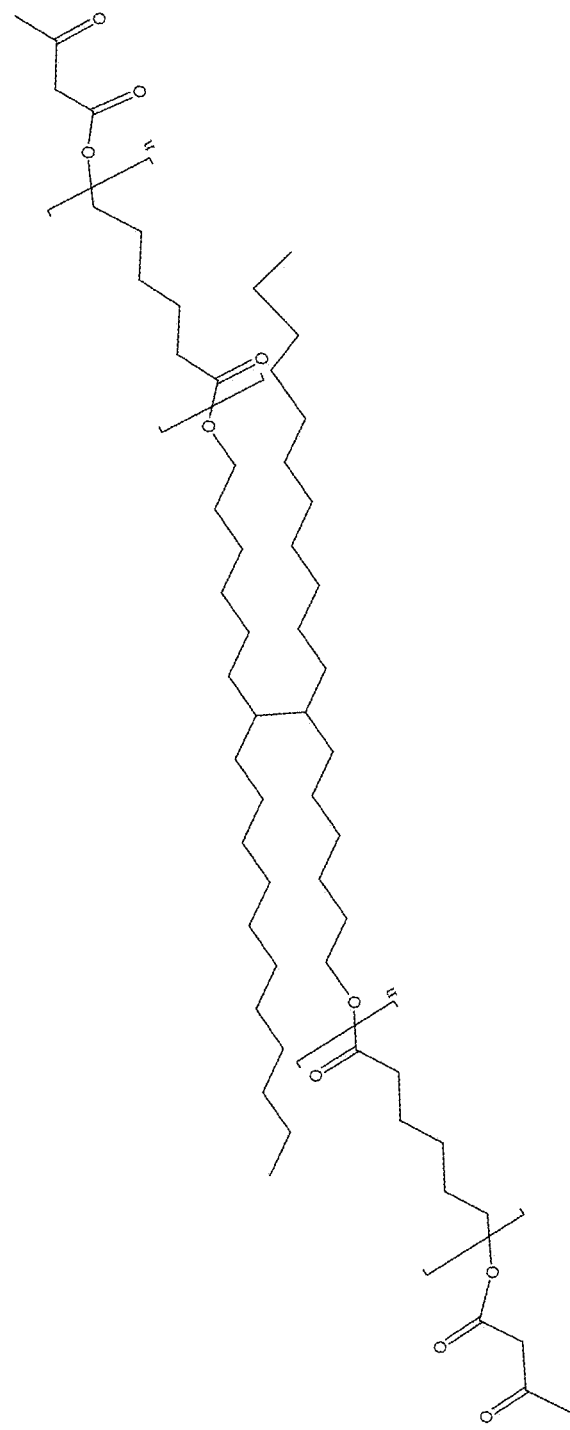
Figure 1B:
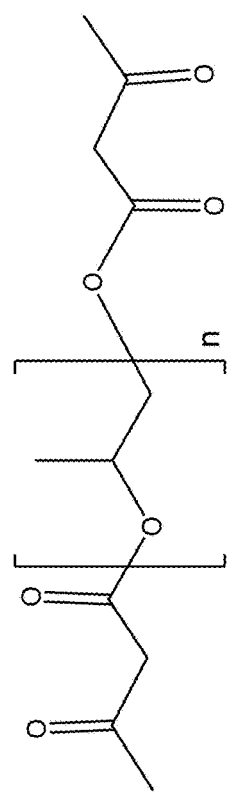
Figure 1D:
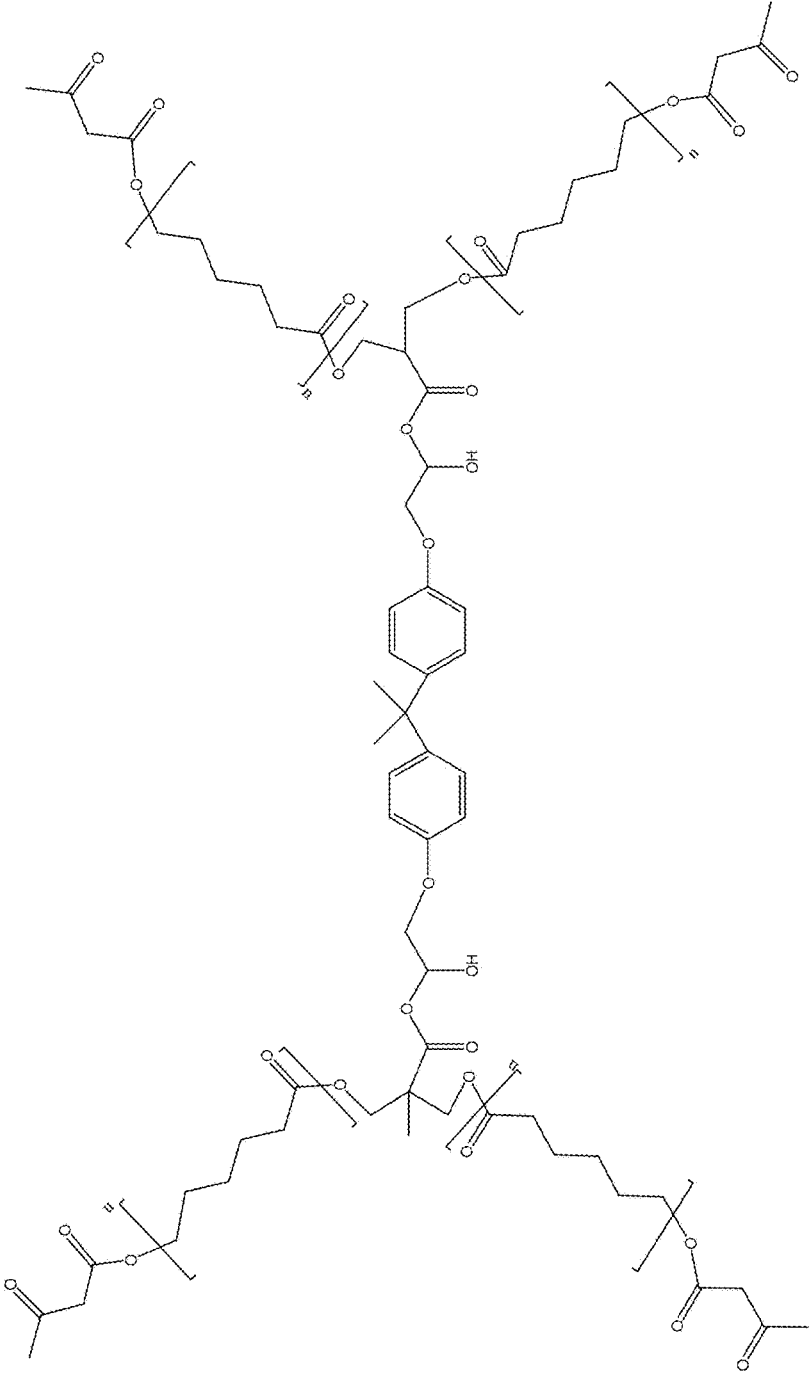

More specific examples of other AcAc functional polymers are shown in FIGS. 1C and 1D. In these Figures, n is at least 3 and may be up to 1,000 (or whatever practical upper limit is set by reaction conditions). Notably, FIG. 1C is representative of a acetoacetate functional dimer fatty acid based polyol/polyester block copolymer, while FIG. 1D is an AcAc functional polymer initially formed from caprolactones. In each instance, the AcAc unit (FIG. 1A) terminates at least one, if not all, of the branches/chains. Notably, these structures are exemplary as specific embodiments, and modifications and derivatives of these structures can also be employed. For example, the length of the repeating chains, as well as the non-AcAc block(s), can be altered.

The acetoacetate functional flexible block copolymer may include at least a hydrophobic polyol block; functional endcaps provided by epoxy groups, acetoacetate groups, or both. Preferably, the endcaps have a functionality greater than 1. In some approaches, the polymer may also include optional functional extension groups such as isocyanates or silicones for flexibility. To provide flexibility, the block copolymer may either include select polyalkylene glycol diol blocks having a molecular weight to impart flexibility or, if the hydrophobic polyol block includes epoxy and/or fatty acid derived polyol groups, then the flexible copolymer may also include one or more lactone-derived flexibility blocks each having the residue of at least 3 or more repeating lactone groups. The optional functional groups may include hydroxyl and other groups that do not create unfavourable reactions/conditions with the remaining constituents.

Use of the foregoing AcAc functional polymers, in combination with the epoxy resin(s) and amine functional curing agents(s) disclosed herein, enable the creation of a flexible coating formulation which is ideally suited for low temperature intumescent applications, with AcAc functional polymer facilitating flexible portions of the epoxy becoming integrated into the final, cured coating. Thus, by judiciously selecting appropriate epoxy resin(s), amine curing agent(s), and intumescent components (acid source, blowing agent, char former, plasticizer, etc.), a thick coating appropriate for intumescent protection can be achieved. Further, owing to its flexibility and low water uptake, the coating can withstand temperature cycling to extreme lows-well beyond current commercially available products.

The epoxy resin binder suitable for this invention can be selected from (a) a bisphenol A/epichlorohydrin derived epoxy resin of typical viscosity 100-2200 mPas (25° C.) and having a weight per epoxide of 165-250 g/Eq, (b) an internally flexibilised bisphenol A/epichlorohydrin derived epoxy resin typical viscosity 500-1400 m Pas but not limited to (25° C.) and having a weight per epoxide of 400-2500 g/Eq (c) a polyacetoacetate epoxy polyester or dimer (or Trimer) fatty acid based polyol polyester block copolymer, (d) polyurethane epoxy resin, (e) alkenyl phenol formaldehyde novolac resin, (f) poly(tetramethylene oxide, (g) Polyglycol diglycidyl ether or castor oil triglycidyl ether resin, epoxy resin binders which can be used in any combinations thereof, in any ratio and in any degrees of purity.

Additional epoxy resin binder suitable for this invention can be selected from but not limited to oxymethylene bisoxirane, epoxidized phenyleneoxyl-(butoxymethyl)ethylene di-functional glycidyl ether epoxy resin, Flexible epoxy resin-dimer acid based, acrylate monomer, C13, C15-alkyl glycidyl ether, Bisphenol F and A/F epoxy and mixtures/derivatives thereof.

These epoxy resin binders preferably have number-average molecular weight (Mn) from about 100 to 12000 Daltons (Da=g/mole) and, more preferably, from about 100 to 3500 Da. Their epoxy equivalent weight (EEW) should range from 75 to 6,000 and, more preferably, 130-2500 g/eq. The glass transition temperature (Tg) of the epoxy resin binder can be from about −80 to 80° C., with −60 to 40° C. and −40 to 30° C. being more preferred ranges.

The epoxy resin binder component is combined with an amine functional curing agent. These agents can be selected from but not limited to polyamines, polyamides, polyamidoamines, aliphatic polyamines, polyamidoimidazolines, polylmidazolines, polyamidoamines, dimerdiamine amines, polyetheramines, phenalkamines, phenalkamides, dimer-diamines, (mixtures of C36 dimeric diamine, C18 amine, C54 or Trimeric amines), fatty alcohol adducted polyamines, cycloaliphatic amines, polyamines, trimeric amines, cycloaliphatic polyamines, polyetherpolyamines, alkyletheramines, polyethylenimines, polyetheramines, polyetherurethanamines, polyether-urethanepolyamines, polyurethaneamines, polyetherpolyamides, polypropyleneamides, polypropyleneamines, polyoxypropylenediamine, polyetherpolyamine or polyaminoamides, polyetheramides, polyetherpolyamides, polyaminoamines, or derived from polytetramethylene ether glycol, polytetramethylene oxide, glycol, polypropylene glycol, propylene oxide, ethylene oxide, dimer (or trimer) fatty acid based amine functional curing agents or a mixture thereof. But not limited to. This is inclusive of adducted above amine curing agents; as well as mixtures of one or more of amine functional curing agents of this type in any ratio and in any degrees of purity modifications combinations and derivatives thereof and mixtures thereof.

Further suitable amine functional curing agent for this invention can be, but not limited to, derived from aliphatic and aromatic amines, cycloaliphatic amines, a Lewis base or a Mannich base. For example, the aliphatic amine linear, branched, and cycloaliphatic amines may be but not limited to alkylene diamines such as ethylene diamine, propylene diamine, diamines are chosen from the group ethylenediamine diethylenetriamine, triethylenetetramine, tetraethylenepentamine, m-xylylendiamine), isophorone diamine. 1,4-diaminobutane, 1,3- or 1,4-cyclohexame diamine, 1,3-diaminopentane, 1,6-diaminohexane, 2,5-diamino-2,5-dimethylhexane, 2,2,4-trimethyl-1,6-diaminohexane, 1,11-diaminoundecane, 1,12-diaminododecane, dimer-diamines (such as but not limited to mixtures of C36 dimeric diamine, C18 amine, C54 or trimeric amines), 1-amino-3,3,5-trimethyl-5-aminomethyl-cyclohexane, 2,4- or 2,6-hexahydrotolxylene diamine, 2,4'- or 4,4'-diaminodicyclohexyl methane, 3,3'-dialkyl-4,4'-diamino-dicyclohexyl methane isophoronediamine, triethylene diamine, trimethythexamethylene diamine, piperazine-n-ethylamine, polyoxyalkylene, diamines made from either or combinations of linear polyether glycol, alkyl phenols, poly (tetramethylene oxide) glycol, polybutylene glycol, ethylene oxide, propylene oxide and/or polyether glycol. In any degrees of purity, modifications combinations and derivatives thereof and mixtures thereof.

In other embodiments, the amine functional curing agent may be a polyamidoimidazoline. Suitable polyamidoimidazolines but not limited to may be formed by any suitable method. For example, such polyamidoimidazolines may include (homo)polymers or copolymers derived from combinations of polyamines and dicarboxylic acids. Examples of suitable polyamines include, but are not limited to one or more of the following: ethylenediamine; diethylenetriamine; triethylenetetramine; tetraethylenepentamine or mixtures thereof. Examples of suitable dicarboxylic acids include, but are not limited to: dimerised or trimerised fatty acids; adipic acid oleic acid, linoleic acid, erucic acid and the like, In any degrees of purity modifications, combinations and derivatives thereof and mixtures thereof mixtures thereof.

In still other embodiments, amine functional curing agents can be polyamines such as diethylene triamine, triethylene tetramine, isophorone diamine, tetraethylene pentamine, alkylene diamines, dicyandiamide, polyamidoamine, polyamide resin, ketimine compounds, m-xylene diamine, m-phenylene diamine, 1,3-bis(aminomethyl)cyclohexane, bis(4-aminocyclohexyl) methane, diethylene glycol-bis-1-propamine, N-aminoethyl piperazine, polyetheramine, polyetherpolyamines Polyetherurethanamine, Polyetherurethane polyamine, dimer diamine, 4,4'-diaminodiphenyl methane, 4,4'-diamino-3,3'-diethyl-diphenyl methane, and diaminodiphenyl sulfone, phenalkamine, mannich bases or derivatives thereof. Commercial grade quality curing agents of any of these polyamines may be used. In any degrees of purity modifications, combinations and derivatives thereof and mixtures thereof mixtures thereof. Adducts of any of these polyamines can also be used.

In addition, adducts of any above amine functional curing agents can also be used. The adduct of an amine functional curing agent is formed by partially reacting amine functional curing agents with a suitable reactive compound, such as an epoxy resin. This reaction will decrease the content of free amine in the curing agent, making it more useful at low temperature and/or high humidity environment.

When polyamides are used as the amine functional curing agent. it can make the coating have a good balance between corrosion resistance and waterproof property. Further polyamides can also make the coating have good flexibility, proper curing rate and other advantageous factor.

The amine functional curing agent's may be produced by any suitable method but are not limited to one or more of the following: in any ratio and in any degrees of purity. combinations/mixtures thereof. Such amine curing agent's may include (homo)polymers or copolymers derived from combinations of polyamines, mannich bases, alkyl phenolic compounds and dicarboxylic acids. Examples of suitable polyamines include, but are not limited to one or more of the following: polyethylenimine: triethylenetetramine; hexamethylenediamine; ethylenediamine; diethylenetriamine, diethylene glycol-bis-1-propamine, tetraethylenepentamine, diethylene glycol-bis1-propamine, isophoronediamine or mixtures thereof. Examples of suitable dicarboxylic acids (or anhydride or ester derivatives) include, but are not limited to one or more of the following: dimerised fatty acids, adipic acid; oleic acid, linoleic acid, erucic acid and the like: decanedioic acid or dimer, or Trimer fatty acids, dimer of stearic acid; dimer of palmitic acid; dimer of lauric acid, adipic acid or type and/or a like. Dicarboxylic acids form of cyclic anhydrides of dicarboxylic acids, examples include maleic anhydride; sulfonic anhydride; phthalic anhydride or mixtures thereof. Dicarboxylic acids can also be used in the form of the di-ester materials such as diethyl malonate; dimethyl malonate or mixtures thereof. Suitably, the dicarboxylic acids are in the form of. In any degrees of purity modifications combinations and derivatives thereof and mixtures thereof mixtures thereof.

The amine functional curing agent has a number-average molecular weight (Mw) from about 100 to 8000 Daltons (Da=g/mole) and, more preferably, from about 200 to 4000 Da. The amine functional curing agent's preferably has an hydrogen equivalent weight (H EqWT) in the range of 50 to 4,000 and, more preferably, 65-1100 g/eq. The glass transition temperature (Tg) may be from about −50 to 50° C. suitably from about −30 to 30° C., or even from about −20 to 20° C.

The epoxy component of the resin system preferably constitutes from 10% to 70% by weight of the total formulation. In turn, amine component preferably constitutes 5% to 60% by weight of the total formulation. In coating compositions, additional components may be added, with weight ratios of epoxy to amine components being adjusted accordingly based on the disclosure for the resin system. Still other coating composition formulations are disclosed in more detail below.

The coating composition of the invention, in one preferred embodiment, is typically 100% solids but may also have additional solvent added to aid application. It is a 2 pack, ambient cure system with one part containing the epoxy resin binder component (Part A) and the other component containing the amine functional curing agent (as described above) functional component (Part B). The intumescent ingredients can be added to either or both components. A catalyst can be included in the composition to aid the curing mechanism. The coating cures to a dry film typically over several hours but this can vary dependent on the choice of resins and catalyst type/level used.

The total resin components of the mixture of Part A and Part B ideally constitute from 15% to 80% by weight of the total coating composition. More preferably the total resin components constitute from 25% to 60% by weight of the coating composition.

The amount of amine functional curing agent may vary depending on the amount of epoxy resin binder to be cured. In general, the amount of amine functional curing agent employed is so that the volumetric ratio of an amine side to an epoxy side is from about 30:70 to about 70:30, with a weight ratio of from about 1:15 to 15:1 being most typical. Typically, the mole ratio of amine functional curing agent to the epoxy resin binder is in the range from about 0.25 to about 2.5, and in one embodiment is about 1.5:1.

A catalyst may be used to aid/quicken curing of the epoxy resin binder with the amine functional curing agent. Catalysts may be selected from compatible tertiary amines, aminophenols, polyalcohols, phenols, phosphines and phosphonium salts. In preferred embodiments, the catalyst is selected from one or more catalysts (accelerators) maybe used to speed up the curing mechanism. The catalysts maybe dipropylenetriamine, benzyldimethylamine, n,n-dimethylpropylamine, bis(dimethylaminoethyl)ether, bis-n,n-dimethylethanolaminether, 1,3-propanediamine, 1,3-bis[3-(dimethylamino)propyl]urea, N'-(3-(dimethylamino)propyl)-N,N-dimethyl, 1,4-diazabicyclooctane (DABCO), 2-(2-(2-dimethylaminoethoxy)-ethylmethylamino)-ethanol, 1,8-diazabicyclo[5.4.0]undec-7-en (DBU), 1,3-propanediamine, N'-(3-(dimethylamino)propyl)-N,N-dimethyl 1,5-diazabicyclo[4.3.0]non-5-en, 1,1,3,3-tetramethylguanidine, N,N,N',N'',N''-pentamethyldiethylentriamine, triphenylphosphine, trioctylphosphine, nonylphenol, 2-ethyl-4-methylimidazole, 2,6-dimethylpyridine, N,N-bis-(2-hydroxyethyl)-3-methylaniline, dimethylphenylphosphine, methyldiphenylphosphine, triphenylphosphite, N,N,N',N'',N''-pentamethyl, dimethylaminopyridine,N-(3-dimethylaminopropyl)-N,N-diisopropanolamine, styrenated phenols,Tris-(dimethylaminomethyl)phenol, amino-n-propyldiethanolamine N,N,N',N'',N''-pentamethyldipropylenetriamine, are preferred.

The catalyst content is preferably in the range of 0.02-5% by weight of the coating composition, more preferably in the range of 0.2-3% by weight of the coating composition.

When formulated as a comprehensive intumescent coating composition, a number of varying additives and enhancements can be employed. First, intumescent compositions according to the invention may contain an epoxy reactive diluent. Epoxy reactive diluents are sometimes used to lower the viscosity of the composition or induce more flexibility into the epoxy coating. Such epoxy reactive diluents may be formed from the reaction of a compound comprising at least one aliphatic epoxide functionality such as diglycidyl ether with an aliphatic alcohol or polyol. Examples of suitable compounds comprising at least one epoxide functionality include, but are not limited to one or more of the following: monoglycidyl ether; polytetramethylene oxide, castor oil triglycidyl ether diglycidyl ether; polypropyleneglycol diglycidyl ether, triglycidyl ether, glycerol propoxylate triglycidyl ether and mixtures thereof. Examples of suitable alcohols and polyols include, but are not limited to one or more of the following: hexanediol; butanediol; glycerol; trimethylolpropane; trimethylolethane; pentaerythritol; neopentyl glycol and mixtures thereof.

Additionally or alternatively, the composition may have a low viscosity acrylate or methacrylate monomers (containing ethylenically unsaturated double bonds) and Allyl monomers. These ethylenically unsaturated monomeric components can be monofunctional, difunctional or trifunctional. Commercially available examples of acrylate or methacrylate reactive monomers include, but are not limited to: 1,6-Hexanediol diacrylate, Trimethylolpropane triacrylate, Tripropylene glycol diacrylate and propoxylated-glyceroltriacrylate or mixture thereof but not limited to, in any ratio or purity.

Further components may be included that react together under the influence of heat from a fire to form a protective insulating foam or char. These intumescent ingredients should be of low solubility to ensure that the coating has an acceptable level of durability, and maintains its integrity throughout the service life of the coating. Additionally, the intumescent ingredients used should have a sufficiently small particle size, in order to obtain satisfactory dispersion in the resin components, and thus allow application by spray application methods giving high rates of transfer of the coating to the substrate.

The intumescent ingredients preferably consist of three components, an acid source, a carbon source and a spumific or gas source. An inorganic "nucleating agent" may also be present along with other, optional additives, all of which may be solid or liquid in nature and added to the composition to aid char formation and/or to strengthen the char. The carbon source may be the epoxy resin itself or an additional source such as pentaerythritol. While this combination of preferred components has proven to produce reliable intumescent compositions, compositions according to this invention need not possess each every item identified in this paragraph. In fact, skilled persons may further adjust the additives and/or provide additional components to further enhance the intumescent protection provided by the inventive coatings contemplated herein. Collectively, any combination of these components will be referred to as an intumescent ingredient package.

Under the influence of heat (between 100° C. and 200° C.) the resin components and the intumescent ingredients begin to melt and flow. As the temperature increases (>200° C.) the acid source, usually by decomposition, produces copious amounts of acid which can react with other constituents in the coating. If the acid source is ammonium polyphosphate, polyphosphoric acids are released which can react with polyhydric alcohols such as pentaerythritol (carbon source) or the epoxy resin to form polyphosphoric acid esters. The decomposition of these esters leads to the formation of carbon compounds, which together with a blowing agent such as melamine, or the ammonium polyphosphate itself, give rise to a carbon foam or char.

Ideally, at least one acid source, either sulphonic or phosphoric acid, is provided. The source of sulphonic or phosphoric can be one or more components(s) that are capable of producing sulphonic or phosphoric acid upon exposure to heat. By exposure to heat, this typically means exposure to temperatures of around 100-250° C. and higher. Examples of such sources include potassium, sodium, or ammonium phosphate or sulphate salts e.g. potassium phosphate (such as potassium tripolyphosphate), para-toluene sulphonic acid, ammonium polyphosphate (APP), monoammonium phosphate, diammonium phosphate, sodium phosphate, ammonium sulphate, potassium sulphate magnesium sulphate and sodium sulphate. The preferred acid source is ammonium polyphosphate. The acid source preferably constitutes from 12% to 80% by weight of the intumescent ingredients content of the coating composition.

Ammonium polyphosphate can vary in molecular weight (chain length), the lower the molecular weight, the higher the solubility. By having very high molecular weight and a cross linked structure it is possible to have very low water solubility, though higher thermal stability is observed.

Coating ammonium polyphosphate with silane, melamine or melamine formaldehyde is beneficial in further reducing solubility and can also lead to higher loadings due to a reduction in resin absorbing properties. The use of coated ammonium polyphosphate is preferred, and ammonium polyphosphate coated with melamine formaldehyde is most preferred.

The intumescent ingredient may also comprise at least one gas source capable of releasing nitrogen or inert gas upon exposure to heat. The gas source preferably constitutes from 0.5% to 50% by weight of the intumescent ingredients content of the coating composition.

Common gas sources are amine-functional. Examples of which include ammonium polyphosphate, azodicarbonamide, p-toluene sulfonylsemicarbazide, 4,4 oxybis (benzene sulfonyl hydrazide), dinitrosopentamethylenetetramine, p-toluene hydrazide, 5-phenyltetrazole, diazoaminobenzene, melamine or melamine derivatives, and urea or urea derivatives.

Melamine derivatives are well known in the art but are not limited to are salts of melamine, such as melamine cyanurate, melamine formaldehyde, methylolated melamine, hexamethoxymethylmelamine, melamine monophosphate, dimelamine phosphate melamine biphosphate, melamine polyphosphate, melamine pyrophosphate, dimelamine phosphate, hydroxymethylated melamine, melamine phosphate melamine monophosphorate, di (melamine phosphorate), hexmethoxymethyl melamine, melamine dihydric phosphorate, melamine borate, hexamethoxymethyl melamine, melem (-2,5,8-triamino 1,3,4,6,7,9,9b-Heptaazaphenalene) and melon (poly[8-amino-1,3,4,6,7,9,9b-Heptaazaphenalene-2,5-diyl)imino and melam (1,3,5-triazine-2,4,6-triamine-n-(4,6-diamino-1,3,5-triazine-2-yl).

Urea derivatives are known in the art and can include N-alkylureas such as methyl urea, N,N'-dialkylureas such as dimethylurea, and N,N,N'-trialkylureas such as timethylurea, guanylurea, guanylurea phosphate, formamide amineo urea, biurea, 1,3-diamino urea guanylurea phosphate.

Still other gases sources include but are not limited to are tris-(hydroxyethyl) isocyanurate (THEIC), Boric Acid, trichloroethyl phosphate (TCEP), trichloropropyl phosphate (TCPP) or chlorinated paraffins. The resin itself may be a gas source as it undergoes decomposition. The preferred gas source is melamine.

Although not an essential ingredient in intumescent reactions, inorganic "nucleating" agents promote sites for the intumescent char to form, thereby improving the thermal resistance properties and stability of the intumescent char during a fire. The intumescent coating compositions of the present invention ideally contain at least one nucleating agent. The nucleating agent preferably constitutes from 0% to 30% by weight of the intumescent ingredients content of the coating composition.

Examples of nucleating agents include titanium dioxide, zinc oxide, aluminium oxide, silica, fumed silica silicates such as magnesium silicate, potassium silicate, sodium silicate, calcium silicate, aluminium silicate, combinations of these five key silicates particularly; calcium magnesium silicate (talc), and zeolites (interlocking tetrahedra of $SiO_4$ and $A1O_4$, metal oxides such as cerium oxide, lanthanum oxide and zirconium oxide, mica and bentonite clay. A preferred nucleating agent is titanium dioxide which also provides opacity to the coating.

Further additives may be optionally included as part of the intumescent ingredients to aid char formation and to strengthen the char and prevent char degradation especially in jetfire scenarios. Such additives include solids such as zinc borate, zinc stannate, Zinc hydroxystannate, glass flake, glass spheres, polymeric spheres), pigment dispersants, stabilisers, mould releasing agents, surface modifiers, flame retardants, antibacterial agents, hydrophobing agents; antimoulds, low density fillers, endothermic fillers, char promoters, radiation curing additives; fluxing aids, and levelling agents. aluminium trihydroxide, aluminium hydroxide antimony oxide, boron phosphate, fumed silica.

Fibres may optionally be added to the intumescent coating composition to strengthen the char, such fibres can be but not limited to ceramic, mineral, carbon, glass/silica based. Fibres can added to the coating composition during it's manufacture or be added to the coating composition just before application.

Fibre examples are inorganic fibres include carbide fibres, such as silicon carbide fibres, boron carbide fibres, niobium carbide fibres; nitride fibres, such as silicon nitride fibres; boron containing fibres, such as boron fibres, boride fibres; silicon-containing fibres, such as silicon fibres, aluminium silicate fibres alumosilicate fibres alumina-boron-silica fibres, E-glass (non-alkaline alumoborosilicate) fibres, C-glass (non-alkaline or low-alkaline soda lime-alumoborosilicate) fibres, organic polymer, A-glass (alkaline soda lime-silicate) fibres, S-glass fibres, CEMFIL-glass fibres, ARG-glass fibres, mineral-glass fibres, non-alkaline magnesia alumosilicate fibres, quartz fibres, silicic acid fibres, silica fibres, high-silica fibres, alumina high-silica fibres, alumosilicate fibres, magnesia, soda silicate fibres, polycarbosilane fibres, polytitanocarbosilane fibres, polysilazane fibres, hydridopolysilazane fibres, tobermorite fibres, samarium silicate fibres, slagwool fibres, wollastonite fibres, potassium aluminium silicate fibres. Metal fibres, such as iron fibres, aluminium fibres, steel fibres, volcanic rock fibres, attapulgite fibres, iron fibres, zinc fibres; carbon fibres, such as pure carbon fibres, graphite fibres, charcoal fibres. Rockwool fibres, such as pure rockwool fibres and basalt rockwool fibres, processed mineral fibres from mineral wool, etc. These fibres can coated or modified by any known process. Blends of fibres may be used.

In the intumescent coating composition of the present invention the preferred fibres are mineral fibres such as rockwool. The amount of the reinforced fiber is typically up to 5 wt %, based on the total weight of the intumescent coating composition, although the amount of the reinforced fiber in the coating composition of the present invention may be any value less than 5 wt. %.

Liquid plasticisers may optionally be added to the intumescent coating composition to increase flexibility. Suitable plasticisers include, but are not limited to the following: aromatic alcohols (i.e., benzyl alcohol and phosphate esters such as triaryl phosphate ester, mono-tbutylphenyl) triphenyl phosphate ester, isopropylated triaryl phosphate ester or combinations thereof. The plasticiser, when present, is typically present in amounts from 0 to 25 weight % based on the total solid weight of the intumescent coating composition.

In order to apply intumescent coatings at high film thickness in a single coat, the rheology modifiers (rheological agents/thixotrope) may be used. Such thixotropic additive(s) preferably constitute from 0.0% to 2% of the total coating composition. A more preferred level is from 0.02% to 1%. Suitable rheology modifiers include organically modified inorganic clays such as bentonite clays, hectorite clays or attapulgite clays, or castor oil and fumed silica or micronized amide waxes or combinations thereof. The most preferred thixotropic additives are micronized amide waxes and fumed silicas.

"High film thickness" will be understood in the context of the field of intumescent coatings, and the term "film" is not intended to imply a maximum except as disclosed herein. Maximum thicknesses realized by the compositions described herein depend on a combination of factors, such as the intended level of protection delivered by the final coating, the substrate, the composition itself and its ability to cure at the environmental conditions in which it is used, and other factors. Non-limiting examples of the attainable and useful maximum thicknesses include: no greater than 50 mm, no great than 40 mm, no greater than 35 mm, no greater than 30 mm, no greater than 28 mm, and no greater than 26 mm. Because intumescent compositions are designed to deliver a minimal level of fire protection, persons skilled in this field will appreciate that the minimum thickness of a coatings is more significant than whatever maximum thickness might be realized, given the extant circumstances (content of the composition, ambient conditions, etc.).

To improve or facilitate dispersion of the intumescent ingredients and also to reduce the overall viscosity of the intumescent coating, it may be necessary to incorporate wetting/dispersion additives. Such additives are usually liquid in form and can be supplied either containing a solvent or be solvent free. Where required preferably a solvent free wetting agent is used, even more preferably a wetting agent with acid functionality is recommended at levels between 0%-2% by weight of the intumescent coating composition.

The total intumescent ingredients ideally constitute from 20% to 90% of the total coating composition. More preferably the total intumescent ingredients constitute from 35% to 80% of the total coating composition.

When the coating is formulated in two parts, the aforementioned organic and inorganic additives are split between the Epoxy Resin Component (Part A) and the Amine Resin Component (Part B) to give the most suitable handling viscosity.

These intumescent coating components are preferably blended into Part A and Part B by the coating manufacturer using high speed dispersion equipment, whereby the solid intumescent ingredients are wetted out and dispersed in the resin components. Optional dispersion aids may be incorporated to facilitate this process.

Prior to application of the intumescent coating composition Part A and Part B are combined in a ratio of typically between 1:4 and 4:1 (by weight) Part A to Part B, more preferably 1:05 to 1:1.5. This can be carried out along with the application by a number of processes:

High Speed dispersion on a mixer or using for example a plaster mixing paddle and then trowel apply. The pot life will typically be around 1-2 hrs depending on the temperature of the material and environmental conditions.

Using a heated plural component airless spray unit for example Graco XM, WIWA Duomix 333PFP. Part A and Part B are heated to a temperature typically between 30 to 50° C. and then mixed in the fluid line before spray application onto the substrate. This temperature can vary depending on mixing machines used, film build of the paint required.

Advantageously since the intumescent coating compositions of the present invention are liquid, the coating composition is easy to apply by conventional methods such as but are not limited to the following: brush, spray coating (airless or conventional spray), roll coating, pouring, dipping, troweling, casting and/or painting.

The intumescent coating compositions of the present invention may also be formulated with small percentage of solvent or no solvent. The volatile organic content (VOC) of the coating compositions of the present invention can be less than 250 g/L. The VOC of the coating composition may be less than 100 g/L. or even less than 50 g/L.

The intumescent coating compositions of the invention may be applied to any suitable substrate. Examples include but are not limited to steel and/or concrete construction units such as beams; hollow beams; cellular beams; columns and hollow columns. This application may be in a single layer or as part of a multi-layer system. In certain embodiments, the intumescent may be applied on top of a primer or as the primer layer itself. The intumescent may form a top coat layer. The intumescent may be applied to a substrate once or multiple times.

These intumescent coating compositions may be cured by a heat curing process. Preferably, the coating composition may be cured at a temperature from about 10 to 50° C. Also, the coating compositions are cured for a period of time from about 18 to 30 hours.

The foregoing examples provide additional details on various aspects disclosed above. In comparing the resins embracing aspects of the invention (i.e., resins 1-5 and trials 11-55), individual values for certain ingredients/components in any two specific resins provide the lower and upper ends of ranges for that ingredient/component. All of these values should, therefore, be considered part of this disclosure of specific and preferred embodiments.

Example 1

A series of resin systems were formulated according to the information provided in Table 1a below. Unless otherwise noted, the conditions and procedures for blending, applying, and curing of these compositions was substantially identical. Testing methods are set forth below, with certain characteristics for these resin systems set forth in Table 1b.

TABLE 1a

Resin system compositions and characteristics.

| | Resin blend | | | | | | |
|---|---|---|---|---|---|---|---|
| | A | B | 1 | 2 | 3 | 4 | 5 |
| Bisphenol A (epoxide eq wt ~185-200) | 21.7 | | 14.37 | 7.51 | 8.77 | 7.85 | 12.82 |
| Polyurethane epoxy (epoxide eq wt ~350-600) | | 27.0 | | | | | |
| Acetoacetoxy polyacetoacetate (AcAc) | | | 7.71 | 11.94 | 5.45 | 10.08 | 11.88 |
| Bisphenol A/F resin (epoxide eq wt ~190-200) | | | | 5.33 | 3.91 | 6.52 | |
| polyamide (H eq wt ~90-110) | 14.1 | 8.35 | 8.96 | 10.99 | | 11.33 | 11.07 |
| Phenalkamine (H eq wt ~130-190) | | | | | 17.64 | | |
| Polytetramethylene ether glycol-based polyether amines (H eq wt ~500-770) | | 4.74 | | | | | |
| Liquid tertiary amine catalyst | | 0.45 | | | | | |
| TOTAL WEIGHT | 35.8 | 35.8 | 35.8 | 35.8 | 35.8 | 35.8 | 35.8 |

Alphabetical designations (i.e., resins blends A and B) are representative of conventional resin systems not expected to have sufficient characteristics as a low temperature and low water adsorption vehicle, while numeric designations (resins 1-5) are representative of certain aspects of the invention.

After 5 days immersion resin blends 1-5 all had very low water adsorption less than 0.85% but in the majority of cases, less than 0.62%. Also, resins 1-5 passed the "manual bend test". Thus, these are key metrics in identifying appropriate resin systems for use in the low temperature intumescent coating.

In contrast, resin blend B incorporated a highly flexible polyurethane epoxy with some polyamide curing agent so as to pass the "manual bend test" down to −60° C. However, this system failed the water adsorption test by an order of magnitude in comparison to resins blends 1-5.

The inventors believe this is representative of a synergistic effect in balancing the flexible components in the system, although the internally flexibilized, acetoacetoxy polyacetoacetate (AcAc) functional epoxy polyester block copolymer (which may include an AcAc functional dimer fatty acid/polyester block copolymer) is believed to cold climate (no cracking at ≤−60° C., as well as the ability to repeatedly cycle down to that temperature without cracking) and water resistance (≤5.0 wt. % increase upon submersion in water-based solutions for a period of time), as well as a coating with sufficient hardness. The specific examples in Tables 1B and 2B further inform the precise characteristics and quantitative measures for the inventive coating.

Example 2

All of the epoxy/amine resin blends from Example 1 were formulated into intumescent coating compositions and tested for low temperature flexibility down to −50° C. after 14 days cure at 23° C. As above, water adsorption was also a significant consideration. All compositions were formulated as two part compositions, as reported in Table 2a below. Various characteristics were tested and reported in Table 2b, with the trial indicated as "COM" being representative of a currently available commercial product.

TABLE 1b

Resin system characteristics.

| | Resin blend | | | | | | |
|---|---|---|---|---|---|---|---|
| | A | B | 1 | 2 | 3 | 4 | 5 |
| Shore D hardness @ 1 day | 45 | 2.5 | 5 | 5 | 10 | 5 | 5 |
| Shore D hardness @ 3 days | 50 | 7.5 | 22.5 | 22.5 | 12.5 | 20 | 17.5 |
| Shore D hardness @ 7 days | 65 | 15 | 30 | 32.5 | 25 | 35 | 27.5 |
| Manual Bend @ −40° C. | Fail | Pass | Pass | Pass | Pass | Pass | Pass |
| Manual Bend @ −60° C. | Fail | Pass | Pass | Pass | Pass | Pass | Pass |
| % Water Adsorption after 5 days immersion | 0.3% | 9.1% | 0.49% | 0.84% | 0.61% | 0.62% | 0.54% |
| Elongation (mm/mm) $10^{-2}$ | 2.13 | 4.43 | 4.64 | 7.58 | 3.11 | 7.41 | n/a |
| Toughness (Pa) $10^{+4}$ | 59.553 | 162.707 | 208.426 | 278.684 | 94.378 | 173.590 | n/a |

TABLE 2a

Paint Compositions.

| | Trial | | | | | |
|---|---|---|---|---|---|---|
| | AA | BB | 11 | 22 | 44 | 55 |
| | Resin system (from TABLE 1a) | | | | | |
| | A | B | 1 | 2 | 4 | 5 |
| Part A | | | | | | |
| Difunctional bisphenol A/epichlorohydrin derived liquid epoxy resin | 21.7 | | 14.37 | 7.51 | 7.85 | 12.82 |
| Polyurethane epoxy (epoxide eq wt ~350-600) | | 27.0 | | | | |
| Acetoacetoxy polyacetoacetate (AcAc) functional epoxy polyester block copolymer | | | 7.71 | 11.94 | 10.08 | 11.88 |
| Bisphenol A/F resin (epoxide eq wt ~190-200) | | | | 5.33 | 6.52 | |
| Titanium dioxide (nucleating agent) | 5.8 | 5.8 | 5.8 | 5.8 | 5.8 | 5.8 |
| Phosphate ester (Liquid plasticiser) | 4.5 | 4.5 | 4.5 | 4.5 | 4.5 | 4.5 |
| Ammonium polyphosphate (acid source) | 31 | 31 | 31 | 31 | 31 | 31 |
| Mineral fibres | 3.35 | 3.35 | 3.35 | 3.35 | 3.35 | 3.35 |
| Part B | | | | | | |
| polyamide (H eq wt ~90-110) | 14.1 | 8.35 | 8.96 | 10.99 | 11.33 | 11.07 |
| Polytetramethylene ether glycol-based polyether amines (H eq wt ~500-770) | | | 4.74 | | | |
| Liquid tertiary amine catalyst example BDMA | | 0.45 | | | | |
| Melamine (blowing agent) | 10.6 | 10.6 | 10.6 | 10.6 | 10.6 | 10.6 |
| Mineral fibres | 2.5 | 2.5 | 2.5 | 2.5 | 2.5 | 2.5 |
| Phosphate ester (Liquid plasticiser) | 4.5 | 4.5 | 4.5 | 4.5 | 4.5 | 4.5 |
| Aluminium hydroxide | 2 | 2 | 2 | 2 | 2 | 2 |
| TOTAL(g) | 100 | 100 | 100 | 100 | 100 | 100 |

TABLE 2b

Paint Characteristics.

| | Trial | | | | | | |
|---|---|---|---|---|---|---|---|
| | AA | BB | COM | 11 | 22 | 44 | 55 |
| Deionised water @ 23° C. (28 days of immersion)* | 2.2% | 34.3% | 16.9% | 1.6% | 2.55% | 2.0% | 4.9% |
| 3% salt water @ 23° C. (28 days of immersion)* | 1.45% | n/a | 11.4% | 1.0% | 2.6% | 1.9% | 3.7% |
| Shore D hardness at 1 day | 50 | 5 | 10 | 2.5 | 5 | 5 | 5 |
| Shore D hardness at 7 days | 55 | 15 | 20 | 37.5 | 25 | 25 | 25 |
| Shore D hardness at 14 days | 65 | 25 | 35 | 40 | 35 | 37.5 | 37.5 |
| No. of cycles in cold climate cracking cycle test | ½ | 3 | 3 | 12 | 12 | 5 | 13 |
| Lowest temperature without cracking (° C.) | −30 | −50 | −50 | −67.5 | −67.5 | −55 | −70 |
| Furnace testing, time to failure @ 500° C. corrected by weight (minutes) | 58 | n/a | n/a | 51.5 | 51 | 50 | 46 |

*water was changed every 7 days, and the initial mould was allowed to set for 14 days.

As with the resin systems in Example 1, both low temperature performance (absolute and number of passing cycles) and water absorption were considered as key metrics. Paint compositions that could not maintain the metrics set forth above were not deemed to provide sufficient, sustained low temperature performance.

Testing Methods

The following test methods inform all aspects of this disclosure. Not only are some of these items pertinent to the examples, but these methods also help to inform the meaning of any relative or comparative terminology used herein. Also, these methods may also be applied within the context of certain aspects of the invention, including those that may be claimed below.

A. Manual Bend Test

A fast screening by way of the "manual bend test" was carried out down to −60° C. The resin blends were made by mixing epoxy and amines resins together and then pouring the mix in to a silicone moulds sized at 60×3×12 mm. The strips produced from this mould were left to cure at 23° C. 50% relative humidity for 14 days. After 14 days, all strips were placed in the Thermotron environmental cabinet and pre-conditioned at 23° C. The temperature of cabinet was reduced by 10° C. per day to −15° C. The first test for bending was carried out at −15° C. each strip was bent with firm pressure to give 90° angle between both fore fingers and thumbs (using thermal gloves) to test for any bending/ movement pass/failure criteria was as follows:

Pass: flexed or was rigid (i.e., would not bend) and did not crack into 2 or break or more pieces.

Fail: strip cracked or broke into 2 or more pieces.

Assuming the first test passed, repeated tests were conducted at 5° C. intervals down to −60° C. If the film snapped into 2 pieces at any stage, the test was recorded as a fail, while progression to −60° C. without failure was recorded as a pass.

The manual bend test results are reported in Table 1b.

B. Shore D Hardness

For purposes of this disclosure, the Shore D hardness was measured using a Elcometer 3120 Shore D Durometer, DIN 53 505 or ISO R 868 test methods. However, other methods and instruments could be used to the extent only a comparative understanding of hardness was required.

The Shore D hardness results are reported in Tables 1b and 2b.

C. Water Absorption

Many combinations of flexible epoxy resins and curing agent are known to be water sensitive, so all epoxy amine resins blends were tested for water adsorption. Generally speaking, the less water absorbed by a resin system, the more durable it should be.

Here, resin blends were made by mixing epoxy and amines resins together and then pouring the mix in to a cube shaped silicone moulds 4.5 cm×2 cm×2 cm and left for 24 hours to cure. The cured resin cubes where removed from silicone mould and left to set for an additional 7 days at 23° C. 50% humidity (unless noted differently, as in Table 2b). Each individual cube was weighted to 4 decimal places before being immersed in deionised water (W1), where they were left for 5 days (or time specified). After immersion each cube was patted dry with an absorbent cloth before weighed again (W2). Then percentage water absorption is then calculated as follows:

Percentage Water absorption=$(W1-W2/W1) \times 100$

The water absorption results are reported in Tables 1b and 2b.

D. Thermal Stress-Strain Analysis

Figure 2A:
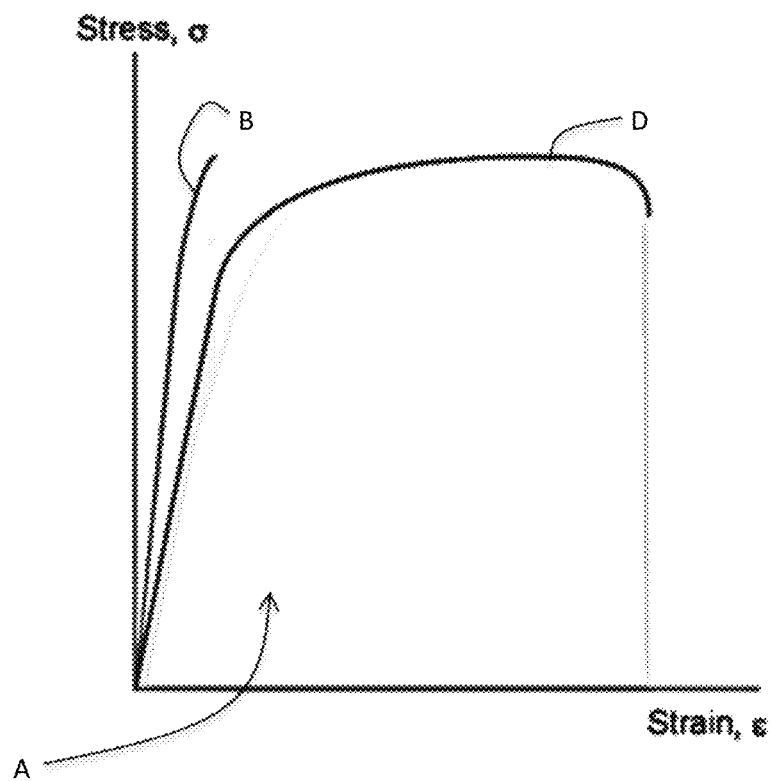
FIG. 2A is a schematic representation of a stress-strain curve for brittle and ductile work pieces, while FIG. 2B schematically illustrates the difference in failure mode for each.
Figure 2B:

For the sake of context, FIG. 2A is a generic representation of stress-strain data. Curve B illustrates a generalized relationship between increasing stress and strain for brittle pieces as compared to curve D for ductile pieces. The terminal point at each curve represents the failure point (graphically illustrated in FIG. 2B). The area under the curve is representative of absorbed energy.

A goal in this analysis is to identify whether the example epoxy/amine cured coatings are brittle or ductile at a specific temperature (e.g., −50° C. as in FIG. 2, although lower temperatures could be used as a benchmark) using TA Instruments RSAG2 according to ASTM D638 Type 5. Dogbones were cut from resin and amine blend cured film (composition of the present invention), conditioned in RSA 3 furnace at −50° C. for 2 minutes and tested at a Hencky strain rate of 0.01% per second to failure at −50° C.

Without intending to be bound by any theory, it is speculated that using more flexible epoxy resins with ductile behaviour allows the energy from the contracting coating to be absorbed within the system rather than the coating snapping in a brittle manner. Another mechanism of energy absorption is also demonstrated by a number of the resin systems withstanding more stress before breakage.

Figure 3:
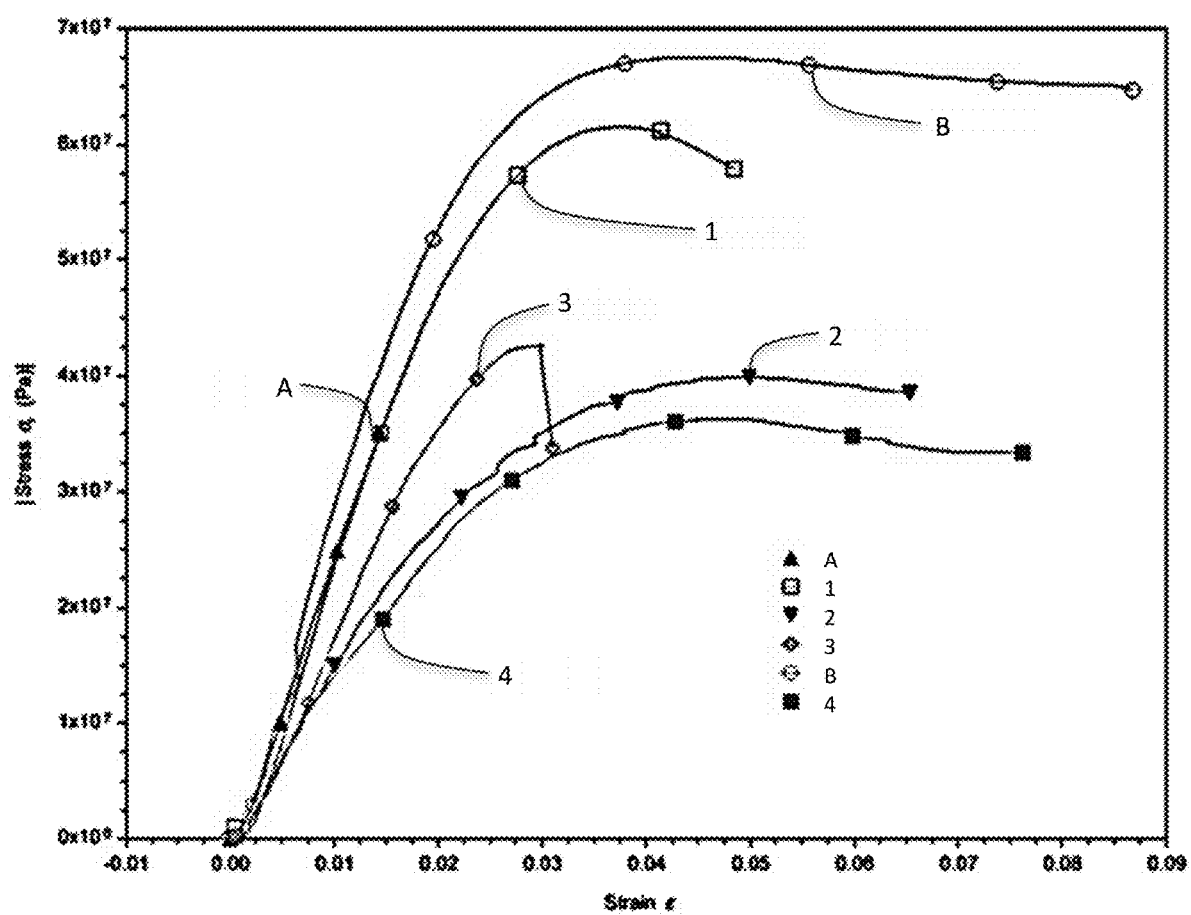
FIG. 3 is a series of stress-strain curves for various resin system formulations reported in Tables 1a and 1b below.

The stress verses strain results are reported in FIG. 3 (although such analysis of resin 5 was not performed/ reported).

E. Thermal Elongation and Toughness

Elongation and toughness of the epoxy/amine film was tested according to ASTM D638 Type 5 at −50° C. The results are reported in Table 1b (as elongation (mm/mm $10^{-2}$ strain at break) and toughness (Pa $10^{+4}$-area under stress-strain curve) are averaged over 6 separate samples from each resin type.

As above, resins blends 1-5 tend to have both higher elongation and toughness than comparative control resin A at −50° C. Thus, resins 1-5 dissipate energy at a much lower temperature with some showing greater ductile behaviour. While resin B appears to perform as well as resins 1-5 in this regard, its lack of water resistance (as noted above) makes it impractical for low temperature use, especially in on-site conditions where environmental exposure to water (via humidity and/or precipitation) is likely.

F. Cold Climate Cracking and Cycle Tests

A target of 20 mm for dry film thickness is used in this test of intumescent paint compositions. The coating was applied to a mild steel T-section (face=300×200×12 mm, length× width×depth), which had been blasted and primed with a blast primer. Intumescent paint was hand applied to the primed piece to a final dry film thickness of 20 mm. The coating left to fully cure for 2 weeks at 23° C. at 50% relative humidity. The dry film thickness measurements recorded across the whole T section. After 2 week each T-section was placed in the Thermotron (Environmental chamber) at 20° C. and allowed to equilibrate for 24 hours.

After equilibration, the temperature of the Thermotron was reduced by 10° C. per day in 5° C. intervals until −50° C. is reached. The sections are studied at each interval. Any visual cracking observed (even hairline) is deemed a failure at that temperature. The temperature is then held at −50° C. for 3 days, after which the temperature is then increased by 10° C. per day at 5° C. intervals until 20° C. is reached.

After each cycle of +20° C. to −50° C. to +20° C. (1 cycle), the condition of the surface of each of the coated T-section was visually checked. The number cycles completed before any coating cracking and/or releasing from the substrate was observed and reported in table 2b above. Testing was considered successful after at least five (5) cycles, although additional, lower temperatures and/or more cycles may have been repeated and reported in certain instances.

Separately, these coated work pieces were cycled down to the lowest possible temperature until a failure was observed. Insofar as −60° C. was the initial benchmark envisioned, cycles proceeded by intervals of only 2.5° C. after that benchmark was passed. As above, any cracking constituted a failure, at which point the lowest previously attained temperature was recorded and total number of cycles to maximum of 12.

G. Furnace Testing

As in cold climate cracking and cycle tests, the paint compositions from Table 2a were hand applied in duplicate onto primed steel panels (300×200×5 mm) at 5-6 mm wet thickness. 400 grams of paint was directly weighed and evenly spread onto each steel panel across whole surface. All panels were left to cure for 14 days at 23° C. at 50% humidity. After 14 days the dry film thickness (DFT) was recorded (measured using an Elcometer 355 Coating Thickness Gauge) across the panel and average taken. This average DFT was then used to calculate a corrected Time To Failure (TTF) by weight on fire test. For this invention, two thermocouples were attached to the back of each of the painted steel panels and mounted vertically so as to allow multiple panels to be tested simultaneously in the same furnace.

The fire test panels were burnt using Hydrocarbon BS 476, Parts 20 & 21 Hydrocarbon fire test curve.

The average thermocouple reading was calculated throughout the test and the TTF recorded as the time when the average thermocouple temperature reached 500° C. The results are in Table 2b.

Table 3 below summarizes the general and preferred weight ranges for the inventive intumescent coating compositions according to certain aspects of this disclosure. Any whole integer falling within these ranges is disclosed and contemplated as part of this disclosure. All weight ranges are with respect to the components for that formulation. In the case of the resin system, intumescent or other additives could be included as separate components carried within the system. Also, the intumescent composition could be formulated as a one or two part coating system, with the information from Table 2A informing the latter.

TABLE 3

Preferred weight percentages for resin system and two-part intumescent coating compositions.

| Component | Intumescent Coating | | |
| --- | --- | --- | --- |
| | Min. | Preferred | Max. |
| Amine functional curing agent(s) | 5.00 | 15.00 to 30.00 | 60.00 |
| Epoxy resin(s) | 10.00 | 15.00 to 25.00 | 70.00 |
| AcAc functional polymer | 0.50 | 5.00 to 25.00 | 30.00 |
| Acid source | 5.00 | ~50 | 70.00 |
| Blowing agent(s) | 0 | ~15 | 25.00 |
| Inorganic fibre(s) | 0 | ~3 | 8.00 |
| Char formation additive(s) | 0.50 | ~3 | 5.00 |
| Nucleating agent(s) | 5.00 | ~10 | 30.00 |
| Liquid Plasticizer(s) | 0 | ~10 | 20.00 |

Certain terms familiar to the coating industry have been used throughout this disclosure, and these should be understood accordingly. By reinforcing mesh we mean a metal, carbon or synthetic mesh or cloth that is incorporated into the coating during application, although one advantage of this invention is that mesh is not required (i.e., the use of mesh generally relates to prior art embodiments that are considered inferior). By visual to the eye we mean even the smallest of highline cracks that can be seen by the eye.

Generally speaking, chemical components and related constituent items should also be selected for workability, cost, and weight. Unless specifically noted, all tests and measurements are conducted in ambient conditions and relying upon commercially available instruments according to the manufacturer-recommended operating procedures and conditions. Unless noted to the contrary (explicitly or within the context of a given disclosure), all measurements are in grams and all percentages are based upon weight percentages.

All coatings contemplated herein normally exceed 5 micrometers in thickness. When applied to a substrate, the dry film thickness of the layer of intumescent coating is typically between 1 mm (millimeters) and 40 mm. The dry film thickness may be measured using an Elcometer Dry Film Thickness Gauge.

To be clear, the stated values herein are merely exemplary of preferred and/or likely ranges. Any and every combination of values within the individually stated minimum and maximum limit are encompassed (e.g., if 1 to 10 is disclosed, every combination of whole integers within the minimum and maximum of those ranges are disclosed, with the incremental value-single digits (1), tenths (0.1), hundredths (0.01), etc.—corresponding to the lowest placeholder provided).

The inventive compositions herein are well suited for coating on steel substrates, and particularly structural steel beams and other load-bearing components. To the extent the intumescent agent is incorporated with epoxy or other thermosetting or thermoplastic resins and curing agents, the inventive formulations can serve as a direct replacement for previously known, structural coatings.

For the avoidance of doubt, the features provided in the above description can be combined in any order. Any appended figures and specific examples described herein are intended to illustrate the invention but are not to be construed as limiting in any manner the scope thereof. In the same manner, although the present embodiments have been illustrated in the accompanying drawings and described in the foregoing detailed description, it is to be understood that the invention is not to be limited to just the embodiments disclosed, and numerous rearrangements, modifications and substitutions are also contemplated. The exemplary embodiment has been described with reference to the preferred embodiments, but further modifications and alterations encompass the preceding detailed description. These modifications and alterations also fall within the scope of the appended claims or the equivalents thereof.

What is claimed is:

1. An intumescent coating composition resistant to cracking at −60° C. and water absorption, the composition comprising:
    a first part comprising at least one epoxy resin, a polyacetoacetate (AcAc) functional polymer, and an optional liquid plasticizer;
    a second part comprising at least one amine functional curing agent including polyamide having an H eq.wt. between 90 and 110, and an optional liquid plasticizer;

an intumescent ingredient package including an acid source, an optional carbon source, and a gas source;
wherein the AcAc functional polymer includes a terminal AcAc unit as follows

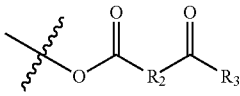

in which $R_2$ is —$CH_2$— and $R_3$ is —$CH_3$; and
wherein the amine functional curing agent includes polytetramethylene ether glycol-based polyether amines having an H eq wt between 500 and 770.

2. The intumescent coating composition according to claim 1 wherein the intumescent ingredient package further comprises at least one of: a nucleating agent, fibres, a plasticiser, rheology modifiers, wetting/dispersion additives, and any combination thereof.

3. The intumescent coating composition according to claim 1 wherein every chain in the AcAc functional polymer ends with the terminal AcAc unit.

4. The intumescent coating composition according to claim 1 wherein the AcAc functional polymer consists of at least 0.50 wt. % relative to a combined mass of the composition.

5. The intumescent coating composition according to claim 4 wherein the AcAc functional polymer consists of about 5.00 to about 25.00 wt. % relative to the combined mass of the composition.

6. The intumescent coating composition according to claim 1 wherein the at least one amine functional curing agent consist of at least 5.00 wt. % relative to a combined mass of the composition.

7. The intumescent coating composition according to claim 6 wherein the amine functional curing agents consist of about 15.00 to about 30.00 wt. % relative to the combined mass of the composition.

8. The intumescent coating composition according to claim 1 wherein the at least one epoxy resin consists of at least 10.00 wt. % relative to a combined mass of the composition.

9. The intumescent coating composition according to claim 8 wherein the at least one epoxy resin consists of about 15.00 to about 25.00 wt. % relative to the combined mass of the composition.

10. The intumescent coating composition according to claim 1 wherein the at least one epoxy resin is derived from bisphenol A.

11. An intumescent coating composition resistant to cracking at −60° C. and water absorption, the composition comprising:
a first part comprising at least one epoxy resin, a polyacetoacetate (AcAc) functional polymer, and an optional liquid plasticizer;
a second part comprising at least one amine functional curing agent including polyamide having an H eq.wt. between 90 and 110, and an optional liquid plasticizer;
an intumescent ingredient package including an acid source, an optional carbon source, and a gas source;
wherein the AcAc functional polymer includes a terminal AcAc unit as follows

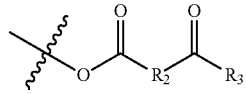

in which $R_2$ is —$CH_2$— and $R_3$ is —$CH_3$; and
wherein the AcAc functional polymer has a structure selected from at least one of:

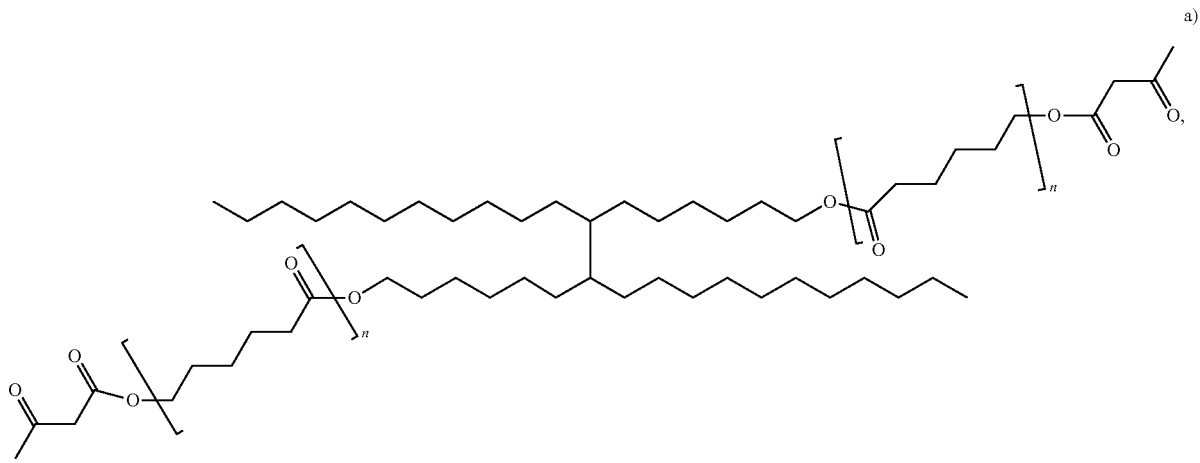

a)

wherein n is at least 3;

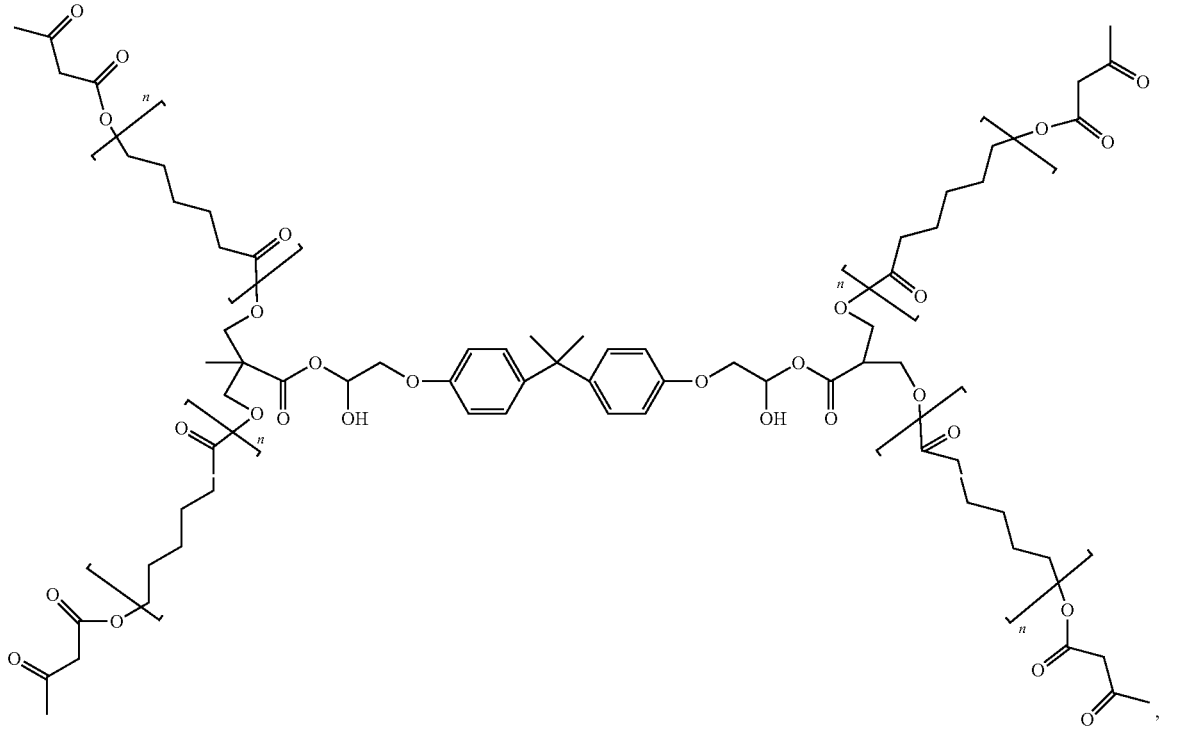

b)

wherein n is at least 3; and

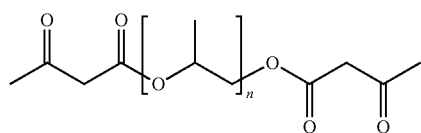

c)

wherein n is any integer from 8 to 68.

12. The intumescent coating composition according to claim 11 wherein the intumescent ingredient package further comprises at least one of: a nucleating agent, fibres, a plasticiser, rheology modifiers, wetting/dispersion additives, and any combination thereof.

13. The intumescent coating composition according to claim 11 wherein every chain in the AcAc functional polymer ends with the terminal AcAc unit.

14. The intumescent coating composition according to claim 11 wherein the AcAc functional polymer consists of at least 0.50 wt. % relative to a combined mass of the composition.

15. The intumescent coating composition according to claim 14 wherein the AcAc functional polymer consists of about 5.00 to about 25.00 wt. % relative to the combined mass of the composition.

16. The intumescent coating composition according to claim 11 wherein the at least one amine functional curing agent consist of at least 5.00 wt. % relative to a combined mass of the composition.

17. The intumescent coating composition according to claim 16 wherein the amine functional curing agents consist of about 15.00 to about 30.00 wt. % relative to the combined mass of the composition.

18. The intumescent coating composition according to claim 11 wherein the at least one epoxy resin consists of at least 10.00 wt. % relative to a combined mass of the composition.

19. The intumescent coating composition according to claim 18 wherein the at least one epoxy resin consists of about 15.00 to about 25.00 wt. % relative to the combined mass of the composition.

20. The intumescent coating composition according to claim 11 wherein the at least one epoxy resin is derived from bisphenol A.

21. An intumescent coating composition resistant to cracking at −60° C. and water absorption, the composition comprising:
    a first part comprising at least one epoxy resin, an polyacetoacetate (AcAc) functional Polymer, and an optional liquid plasticizer;
    a second part comprising at least one amine functional curing agent including polyamide having an H eq.wt. between 90 and 110, and an optional liquid plasticizer;
    an intumescent ingredient package including an acid source, an optional carbon source, and a gas source;
    wherein the AcAc functional polymer includes a terminal AcAc unit as follows

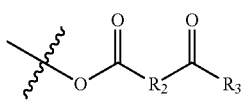

in which $R_2$ is —$CH_2$— and $R_3$ is —$CH_3$; and wherein the AcAc functional polymer is integrated with the epoxy resin so that the epoxy resin includes the at least one terminal AcAc unit.

22. The intumescent coating composition according to claim 21 wherein the intumescent ingredient package further comprises at least one of: a nucleating agent, fibres, a plasticiser, rheology modifiers, wetting/dispersion additives, and any combination thereof.

23. The intumescent coating composition according to claim 21 wherein every chain in the AcAc functional polymer ends with the terminal AcAc unit.

24. The intumescent coating composition according to claim 21 wherein the AcAc functional polymer consists of at least 0.50 wt. % relative to a combined mass of the composition.

25. The intumescent coating composition according to claim 24 wherein the AcAc functional polymer consists of about 5.00 to about 25.00 wt. % relative to the combined mass of the composition.

26. The intumescent coating composition according to claim 21 wherein the at least one amine functional curing agent consist of at least 5.00 wt. % relative to a combined mass of the composition.

27. The intumescent coating composition according to claim 26 wherein the amine functional curing agents consist of about 15.00 to about 30.00 wt. % relative to the combined mass of the composition.

28. The intumescent coating composition according to claim 21 wherein the at least one epoxy resin consists of at least 10.00 wt. % relative to a combined mass of the composition.

29. The intumescent coating composition according to claim 28 wherein the at least one epoxy resin consists of about 15.00 to about 25.00 wt. % relative to the combined mass of the composition.

30. The intumescent coating composition according to claim 21 wherein the at least one epoxy resin is derived from bisphenol A.

* * * * *